(12) United States Patent
Huang

(10) Patent No.: US 11,084,742 B2
(45) Date of Patent: Aug. 10, 2021

(54) ACTIVATED HYBRID ZERO-VALENT IRON TREATMENT SYSTEM AND METHODS FOR GENERATION AND USE THEREOF

(71) Applicant: The Texas A&M University System, College Station, TX (US)

(72) Inventor: Yongheng Huang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 258 days.

(21) Appl. No.: 15/537,034

(22) PCT Filed: Dec. 18, 2015

(86) PCT No.: PCT/US2015/066857
§ 371 (c)(1),
(2) Date: Jun. 16, 2017

(87) PCT Pub. No.: WO2016/100908
PCT Pub. Date: Jun. 23, 2016

(65) Prior Publication Data
US 2018/0111855 A1    Apr. 26, 2018

Related U.S. Application Data

(60) Provisional application No. 62/094,120, filed on Dec. 19, 2014.

(51) Int. Cl.
*C02F 1/52* (2006.01)
*C02F 1/28* (2006.01)
(Continued)

(52) U.S. Cl.
CPC ............ *C02F 1/5236* (2013.01); *C02F 1/281* (2013.01); *C02F 1/70* (2013.01); *C02F 2001/007* (2013.01);
(Continued)

(58) Field of Classification Search
CPC ...................................... C02F 1/5236
See application file for complete search history.

(56) References Cited

U.S. PATENT DOCUMENTS

| 4,280,911 A | 7/1981 | Durda et al. |
| 4,599,177 A | 7/1986 | Hayashi |

(Continued)

FOREIGN PATENT DOCUMENTS

| CN | 1926071 A | 3/2007 |
| WO | 95/06004 A1 | 3/1995 |

(Continued)

OTHER PUBLICATIONS

Cahan, B.D., and C.-T. Chen, "The Nature of the Passive Film on Iron. III. The Chemi-Conductor Model and Further Supporting Evidence," Journal of the Electrochemical Society 129(5) 921-925, 1982.

(Continued)

*Primary Examiner* — Peter Keyworth
(74) *Attorney, Agent, or Firm* — Christensen O'Connor Johnson Kindness PLLC

(57) ABSTRACT

Activated iron media and methods for generating and using the activated iron media. The method involves aqueous suspension comprising a zero-valent iron, ferrous iron, and an iron oxide to provide a settled solid and re-suspending the settled solid to provide an aqueous suspension containing an activated iron media.

7 Claims, 11 Drawing Sheets

(51) Int. Cl.

| | |
|---|---|
| C02F 101/10 | (2006.01) |
| C02F 101/16 | (2006.01) |
| C02F 103/18 | (2006.01) |
| C02F 101/20 | (2006.01) |
| C02F 103/10 | (2006.01) |
| C02F 1/70 | (2006.01) |
| C02F 1/00 | (2006.01) |
| C02F 101/36 | (2006.01) |

(52) U.S. Cl.
CPC .. *C02F 2101/106* (2013.01); *C02F 2101/163* (2013.01); *C02F 2101/20* (2013.01); *C02F 2101/36* (2013.01); *C02F 2103/10* (2013.01); *C02F 2103/18* (2013.01)

(56) References Cited

U.S. PATENT DOCUMENTS

| | | | |
|---|---|---|---|
| 5,389,262 | A | 2/1995 | Guess |
| 5,620,607 | A | 4/1997 | Bowie, Jr. |
| 5,635,073 | A | 6/1997 | Aktor |
| 5,798,043 | A | 8/1998 | Khudenko |
| 5,833,388 | A | 11/1998 | Edwards |
| 5,833,855 | A | 11/1998 | Saunders |
| 5,975,800 | A | 11/1999 | Edwards |
| 6,132,623 | A | 10/2000 | Nikolaidis |
| 6,193,858 | B1 | 2/2001 | Hradil |
| 6,207,114 | B1 | 3/2001 | Quinn |
| 6,254,786 | B1 | 7/2001 | Carpenter |
| 6,322,701 | B1 | 11/2001 | Delighiannis |
| 6,358,396 | B1 | 3/2002 | Gu |
| 6,432,693 | B1 | 8/2002 | Hince |
| 6,531,065 | B2 | 3/2003 | Gurol |
| 6,719,902 | B1 | 4/2004 | Alvarez |
| 6,761,827 | B2 | 7/2004 | Coffey |
| 6,770,483 | B2 | 8/2004 | Lyon |
| 6,833,075 | B2 | 12/2004 | Hughes |
| 6,921,477 | B2 | 7/2005 | Wilhelm |
| 6,942,807 | B1 | 9/2005 | Meng |
| 6,982,040 | B2 | 1/2006 | Costa |
| 7,008,964 | B2 | 3/2006 | Clausen |
| 7,025,887 | B1 | 4/2006 | Kirts |
| 7,147,786 | B2 | 12/2006 | Costa |
| 7,160,465 | B2 | 1/2007 | Kirts |
| 7,179,633 | B2 | 2/2007 | Kumar et al. |
| 7,201,841 | B2 | 4/2007 | Hughes |
| 7,238,278 | B2 | 7/2007 | Coffey |
| 7,255,793 | B2 | 8/2007 | Cort |
| 7,320,761 | B2 | 1/2008 | Costa |
| 7,329,349 | B2 | 2/2008 | Hill |
| 7,393,452 | B2 | 7/2008 | Tay |
| 7,470,369 | B2 | 12/2008 | Diallo |
| 7,476,324 | B2 | 1/2009 | Ciampi |
| 7,531,089 | B2 | 5/2009 | Mankiewicz |
| 7,540,966 | B2 | 6/2009 | Costa |
| 7,572,378 | B2 | 8/2009 | Rosen |
| 7,575,682 | B2 | 8/2009 | Olsta |
| 7,611,637 | B2 | 11/2009 | Zhang |
| 7,758,755 | B2 | 7/2010 | Diallo |
| 7,785,468 | B2 | 8/2010 | Baseeth |
| 7,850,854 | B2 | 12/2010 | Gurol |
| 7,854,330 | B2 | 12/2010 | Olsta |
| 7,897,049 | B2 | 3/2011 | Ghosh |
| 8,025,800 | B2 | 9/2011 | Kane |
| 8,048,317 | B2 | 11/2011 | Rima |
| 8,057,675 | B2 | 11/2011 | Baseeth |
| 8,057,682 | B2 | 11/2011 | Hoag |
| 8,071,055 | B2 | 12/2011 | Newcombe |
| 8,080,163 | B2 | 12/2011 | Moller |
| 8,101,087 | B2 | 1/2012 | Kane |
| 8,114,279 | B2 | 2/2012 | Jin |
| 2003/0132160 | A1 | 7/2003 | Khudenko |
| 2003/0196961 | A1 | 10/2003 | Santina |
| 2004/0134857 | A1 | 7/2004 | Ruling |
| 2005/0051493 | A1 | 3/2005 | Hensman |
| 2005/0103707 | A1 | 5/2005 | Olsta |
| 2005/0133458 | A1 | 6/2005 | Gurol |
| 2006/0032803 | A1 | 2/2006 | Costa |
| 2006/0049091 | A1 | 3/2006 | Cheetham |
| 2006/0175266 | A1 | 8/2006 | Rima |
| 2006/0249465 | A1 | 11/2006 | Jin |
| 2006/0286888 | A1 | 12/2006 | Olsta |
| 2006/0289349 | A1 | 12/2006 | Hughes |
| 2007/0029894 | A1 | 2/2007 | Cort |
| 2007/0119785 | A1 | 3/2007 | Englehardt |
| 2007/0158275 | A1 | 7/2007 | Zhang |
| 2007/0163958 | A1 | 7/2007 | Newcombe |
| 2007/0181511 | A1 | 8/2007 | Smith |
| 2007/0209989 | A1 | 9/2007 | Hayashi |
| 2007/0227981 | A1 | 10/2007 | Olsta |
| 2007/0241063 | A1 | 10/2007 | St-Laurent |
| 2007/0256985 | A1 | 11/2007 | Zhao |
| 2008/0073280 | A1 | 3/2008 | Cort |
| 2008/0073281 | A1 | 3/2008 | Cort |
| 2008/0073282 | A1 | 3/2008 | Cort |
| 2008/0073283 | A1 | 3/2008 | Cort |
| 2008/0073284 | A1 | 3/2008 | Cort |
| 2008/0135491 | A1 | 6/2008 | Cort |
| 2008/0161184 | A1 | 7/2008 | Tseng |
| 2008/0185341 | A1 | 8/2008 | Diallo |
| 2008/0264876 | A1 | 10/2008 | Block |
| 2008/0311288 | A1 | 12/2008 | Dong |
| 2009/0127208 | A1 | 5/2009 | Berkowitz |
| 2009/0191084 | A1 | 7/2009 | Liskowitz |
| 2009/0200233 | A1 | 8/2009 | Bergendahl |
| 2009/0200246 | A1 | 8/2009 | King |
| 2009/0230054 | A1* | 9/2009 | DeBusk ............ C02F 1/5245 210/602 |
| 2009/0272698 | A1 | 11/2009 | Hill |
| 2009/0298165 | A1 | 12/2009 | Wiedemann |
| 2010/0126944 | A1 | 5/2010 | Braida |
| 2010/0126945 | A1 | 5/2010 | Patel |
| 2010/0140185 | A1 | 6/2010 | Hill |
| 2010/0147769 | A1 | 6/2010 | Kane |
| 2010/0227381 | A1 | 9/2010 | Hoag |
| 2010/0276360 | A1 | 11/2010 | Smith |
| 2010/0282690 | A1 | 11/2010 | Padmanabhan |
| 2010/0307980 | A1 | 12/2010 | Tranter |
| 2011/0000854 | A1 | 1/2011 | Nichols |
| 2011/0017671 | A1 | 1/2011 | Alley, Jr. |
| 2011/0094972 | A1 | 4/2011 | King |
| 2011/0114563 | A1 | 5/2011 | Kane |
| 2011/0120929 | A1 | 5/2011 | Ghosh |
| 2011/0139726 | A1 | 6/2011 | Jin |
| 2011/0174743 | A1 | 7/2011 | Huang |
| 2011/0309021 | A1 | 12/2011 | Jin |
| 2011/0309023 | A1 | 12/2011 | Kane |
| 2012/0055873 | A1 | 3/2012 | Hoag |
| 2012/0273431 | A1 | 11/2012 | Huang |

FOREIGN PATENT DOCUMENTS

| | | |
|---|---|---|
| WO | 95/06005 A1 | 3/1995 |
| WO | 98/49106 A1 | 11/1998 |
| WO | 99/28243 A1 | 6/1999 |
| WO | 99/65830 A1 | 12/1999 |
| WO | 2004/071960 A2 | 8/2004 |
| WO | 2004/099093 A1 | 11/2004 |
| WO | 2005/042412 A1 | 5/2005 |
| WO | 2005/102942 A1 | 11/2005 |
| WO | 2006/065825 A2 | 6/2006 |
| WO | 2007/092914 A2 | 8/2007 |
| WO | 2008/039936 A2 | 4/2008 |
| WO | 2008/119063 A1 | 10/2008 |
| WO | 2008/136814 A2 | 11/2008 |
| WO | 2011/035263 A2 | 3/2011 |
| WO | 2011/046943 A1 | 4/2011 |
| WO | 2011/056203 A2 | 5/2011 |

OTHER PUBLICATIONS

Huang, Y.H., and T.C. Zhang, "Effects of Dissolved Oxygen on Formation of Corrosion Products and Concomitant Oxygen and

(56) References Cited

OTHER PUBLICATIONS

Nitrate Reduction in Zero-Valent Iron Systems With or Without Aqueous $FE^2$," Water Research 39(9):1751-1760, May 2005.

Huang, Y.H., and T.C. Zhang, "Enhancement of Nitrate Reduction in $Fe^°$-Packed Columns by Selected Cations," Journal of Environmental Engineering 131(4):603-611, Apr. 2005.

Huang, Y.H., and T.C. Zhang, "Kinetics of Nitrate Reduction by Iron at Near Neutral pH," Journal of Environmental Engineering 128(7):604-611, Jul. 2002.

Huang, Y.H., and T.C. Zhang, "Nitrite Reduction and Formation of Corrosion Coatings in Zerovalent Iron Systems," Chemosphere 64(6):937-943, Aug. 2006.

Huang, Y.H., and T.C. Zhang, "Reduction of Nitrobenzene and Formation of Corrosion Coatings in Zerovalent Iron Systems," Water Research 40(16):3075-3082, Sep. 2006.

Huang, Y.H., et al., "Effects of Oxide Coating and Selected Cations on Nitrate Reduction by Iron Metal," Journal of Environmental Quality 32(4):1306-1315, Jul./Aug. 2003.

Kanel, S.R., et al., "Removal of Arsenic(III) From Groundwater by Nanoscale Zero-Valent Iron," Environmental Science & Technology 39(5):1291-1298, Mar. 2005.

Meng, X., et al., "Removal of Selenocyanate From Water Using Elemental Iron," Water Research 36(15):3867-3873, Sep. 2002.

Ponder, S.M., et al., "Remediation of Cr(VI) and Pb(II) Aqueous Solutions Using Supported, Nanoscale Zero-Valent Iron," Environmental Science & Technology 34(12):2564-2569, Jun. 2000.

Shaw, J.A., "The Design of Draft Tube Circulators," Proceedings of the Australasian Institute of Mining and Metallurgy 283:47-58, Sep. 1982.

Wang, J., et al., "Performance and Characteristics of an Anaerobic Baffled Reactor," Bioresource Technology 93(2):205-208, Jun. 2004.

Zhang, T.C., and Y.H. Huang, "Effects of Surface-Bound $FE^{2+}$ on Nitrate Reduction and Transformation of Iron Oxide(s) in Zero-Valent Iron Systems at Near-Neutral pH," Journal of Environmental Engineering 132(5):527-536, May 2006.

Zhang, T.C., and Y.H. Huang, "Profiling Iron Corrosion Coating on Iron Grains in a Zerovalent Iron System Under the Influence of Dissolved Oxygen," Water Research 40(12):2311-2320, Jul. 2006.

Huang, Y., "Nitrate Degradataion by $Fe^°$: Mechanisms, Kinetics, and the Role of Iron Oxide Coatings," doctoral dissertation, University of Nebraska, Lincoln, Nebraska, 2002, 260 pages.

International Preliminary Report on Patentability dated Mar. 20, 2012, issued in International Application No. PCT/US2010/049528, filed Sep. 20, 2010, 5 pages.

International Search Report dated May 31, 2011, issued in International Application No. PCT/US2010/049528, filed Sep. 20, 2010, 3 pages.

Notification of the First Office Action dated Aug. 30, 2012, issued in Chinese Application No. 201080052261.8, filed Sep. 20, 2010, 8 pages.

Extended European Search Report dated Oct. 1, 2013, issued in European Application No. 10817988.8, filed Sep. 20, 2010, 9 pages.

Chinese Rejection Decision dated Jun. 8, 2015, issued in Chinese Application No. 201080052261.8, filed Sep. 20, 2010, 8 pages.

Eurasian Official Action dated Apr. 7, 2015, and Russian foreign associate's comments dated Jun. 8, 2015, issued in Eurasian Application No. 201290898, filed Sep. 20, 2010, 5 pages.

Zhang, Y., et al., "Effect of Arsenate and Molybdate on Removal of Selenate From an Aqueous Solution by Zeo-Valent Iron," Science of the Total Environment 350(1-3):Nov. 1-11, 2005.

Zhang, Y. et al., "Removal of Selenate from Water by Zerovalent Iron," Journal of Environmental Quality 34(2), Mar. 2005, 1 page.

Chu, P., "Treatment Technology Summary for Critical Pollutants of Concern in Power Plant Wastewaters," Electric Power Research Institute, Technical Update, Jan. 2007, pp. 1-88.

Communication Pursuant to Article 94(3) EPC dated May 16, 2017, issued in European Application No. 10817988.8, filed Sep. 20, 2010, 8 pages.

International Search Report and Written Opinion dated Mar. 3, 2016, issued in International Application No. PCT/US2015/066857, filed Dec. 18, 2015, 9 pages.

Notice of Reexamination dated Jan. 29, 2016, issued in Chinese Application No. 201080052261.8, filed Sep. 20, 2010, 9 pages.

\* cited by examiner

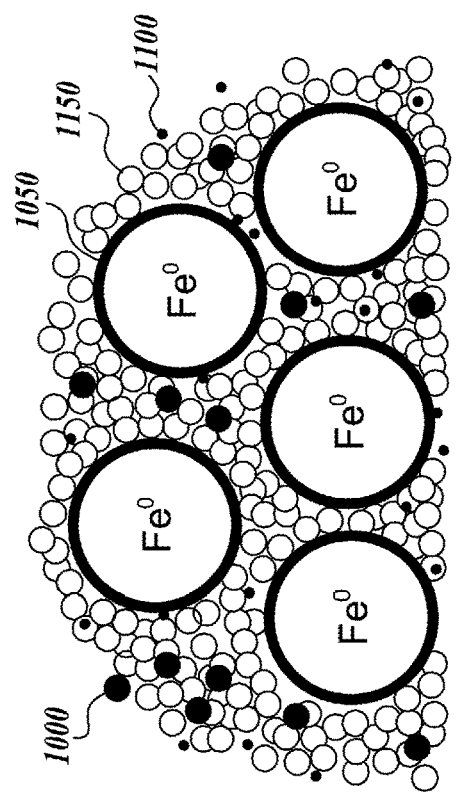
FIG. 1A
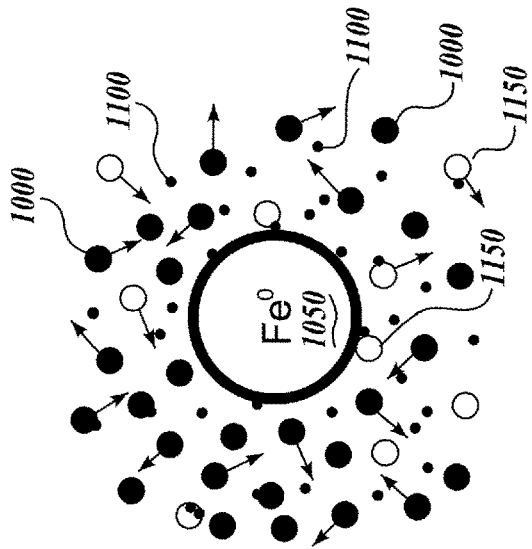
FIG. 1B
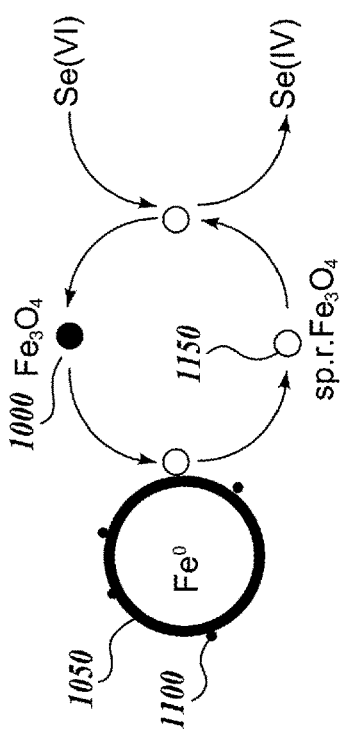
FIG. 1C
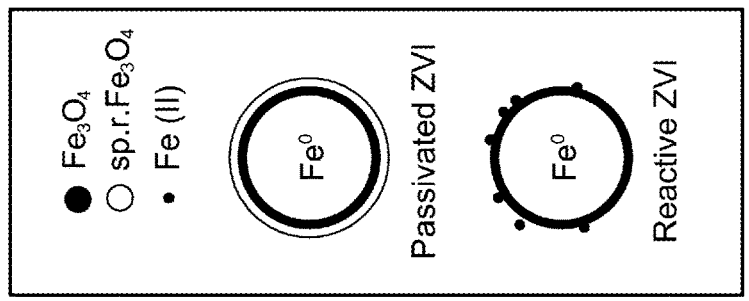

ACTIVATED HYBRID ZERO-VALENT IRON TREATMENT SYSTEM AND METHODS FOR GENERATION AND USE THEREOF

CROSS-REFERENCES TO RELATED APPLICATIONS

This application is the national stage of International Application No. PCT/US2015/066857, filed Dec. 18, 2015, which claims the benefit of Provisional Application No. 62/094,120, filed Dec. 19, 2014, the entire disclosure of said applications is hereby incorporated by reference herein.

BACKGROUND OF THE INVENTION

Wastewater treatment remains a challenging environmental problem. Chemical wastewater treatment systems have been developed to address the problem and have achieved varying degrees of success. Among chemical treatment systems, activated iron (zero valent iron) systems have been shown to be effective for reducing the concentration of contaminants for a variety of water sources including surface water, ground water, and industrial waste streams.

Despite the advances in the development of wastewater treatment systems, there is a need for cost-effective and reliable treatment systems having improved performance. The present invention seeks to fulfill this need and provides further related advantages.

SUMMARY OF THE INVENTION

The present invention provides activated iron media and methods for generating, regenerating, and using the activated iron media.

In one aspect, the invention provides a method of generating an activated iron media for wastewater treatment. In one embodiment, the method comprises:

(a) settling an aqueous suspension comprising a zero-valent iron, ferrous iron, and an iron oxide to provide a settled solid and a supernatant solution substantially free of particles comprising zero-valent iron and iron oxide; and (b) resuspending the settled solid to provide an aqueous suspension comprising activated iron media.

In the above method, steps (a) and (b) can be repeated one or more times. The number of cycles will depend on the desired level of activity of iron media formed by the method. The method can be carried out in the absence of a contaminated fluid prior to contact with the fluid. Alternatively, the method can be carried out in the presence of a contaminated fluid and the steps (a) and (b) repeated one or more times depending on the desired level of removal or concentration reduction of contaminants desired, the nature of the contaminants themselves, and the extent to which the fluid is contaminated.

In certain embodiments, settling the suspension comprises settling by gravity. In other embodiments, settling the suspension comprises centrifugation.

In certain embodiments, the iron oxide is generated by a reaction of the zero-valent iron and ferrous iron. In other embodiments, the iron oxide is an added iron oxide. In certain embodiments, the iron oxide comprises magnetite. In certain embodiments, iron oxide of the activated iron media comprises a Fe(II)-enriched magnetite.

In another aspect, the invention provides an activated iron media, which is obtainable by the method of the invention.

In a further aspect of the invention, a method for removing or reducing a concentration of a contaminant in a fluid using the activated iron media is provided. In one embodiment, the method comprises:

(a) settling an aqueous suspension comprising a zero-valent iron; ferrous iron; and an iron oxide to provide a settled solid and a supernatant solution substantially free of particles comprising zero-valent iron and iron oxide;

(b) re-suspending the settled solid to provide an aqueous suspension comprising activated iron media; and (c) contacting a fluid comprising a contaminant with the aqueous suspension comprising activated iron media.

In the above method, step (a) can be considered to be a charging phase (i.e., generating or regenerating activated iron media by intimate contact of the iron components) and step (c) can be considered the reaction phase (i.e., contaminant removal or concentration reduction).

In one embodiment, the method further comprises step (d): settling the aqueous suspension to provide a supernatant effluent and a settled solid. In this embodiment, the method can further comprise step (e): re-suspending the settled solid in the fluid. Thus, in certain embodiments, the methods includes repeating steps (d) and (e) one or more times.

In certain embodiments, the methods further include removing the supernatant effluent from the settled solid.

In certain embodiments, steps (a)-(f) are performed in a first reactor. In certain embodiments, the contents of the first reactor are constantly stirred during steps (b), (c), and (e).

In certain embodiments, steps (a) and (d) are performed in a settling tank separate from the first reactor. In certain of these embodiments, the method further comprises transferring at least a portion of the suspension from the first reactor to the settling tank.

In certain embodiments, when performing steps (b) or (e) in a first reactor, the method further comprises transferring a settled solid from the settling tank to the first reactor, when steps (a) or (d) are performed in a settling tank.

In certain embodiments, steps (a)-(e) are performed in each of two or more reactors.

Contaminants that may be advantageously removed or reduced in concentration include metal compounds, metal ions, metalloids, oxyanions, chlorinated organic compounds, and combinations thereof. Representative contaminants that are effectively treated in the methods of the invention include nitrate and selenium species.

Representative selenium species include selenate ($Se^{6+}$), selenite ($Se^{4+}$), and selenide ($Se^{-2}$) species, as well as selenocyanate, selenomethionine, and methylselenic acid, and mixtures thereof.

The source of contaminated water treated by the methods of the invention can be varied, and include flue gas desulfurization wastewater, industrial waste stream, oil refinery waste, tail water of a mining operation, stripped sour water, surface water, ground water, and an influent stream. In certain embodiments, the contaminated water is flue gas desulfurization wastewater.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a schematic illustration of magnetite particles [$Fe_3O_4$ and super-reactive $Fe_3O_4$ (sp.r. $Fe_3O_4$)] functioning as electron shuttle and reactive site for reduction of contaminants.

FIG. 1B is a schematic illustration of collisions of magnetite particles [$Fe_3O_4$ and super-reactive $Fe_3O_4$ (sp.r. $Fe_3O_4$)] with zero-valent iron grains and Fe(II) as occurs in a reactor.

FIG. 1C is a schematic illustration of a compact blanket of settled magnetite particles [$Fe_3O_4$ and super-reactive $Fe_3O_4$ (sp.r. $Fe_3O_4$)], zero-valent iron, and Fe(II) that allows efficient transfer of electrons from ZVI to magnetite to produce quantities of super-reactive magnetite.

DETAILED DESCRIPTION

Figure 2A:
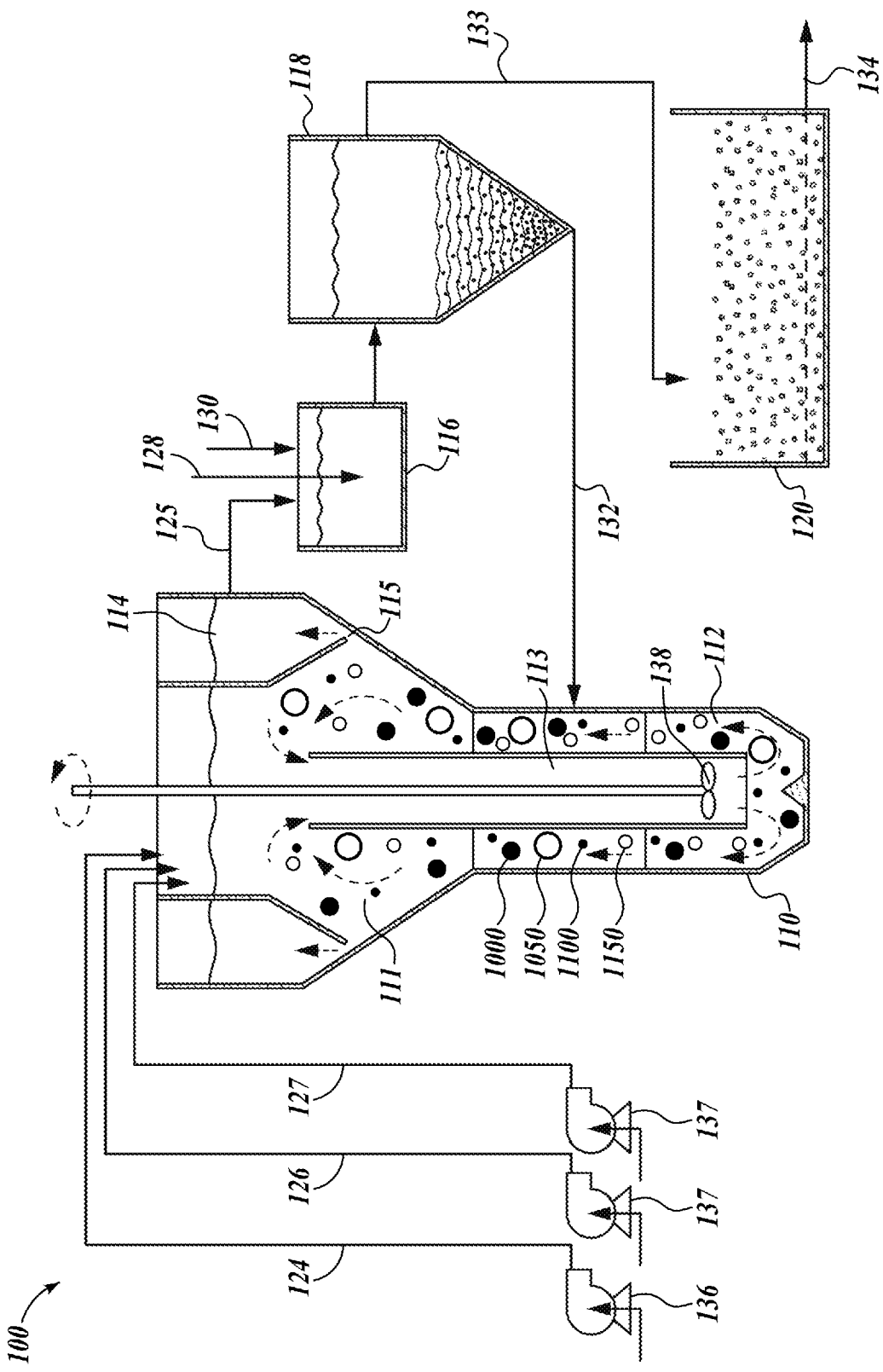
FIG. 2A is a schematic illustration of a representative reactor system that includes a hybrid zero-valent iron composite for wastewater treatment.

The present invention provides activated iron media and methods for generating, regenerating, and using the activated iron media.

In one aspect, the invention provides a method of generating an activated iron media for wastewater treatment. In one embodiment, the method comprises:

(a) settling an aqueous suspension comprising a zero-valent iron; ferrous iron; and an iron oxide to provide a settled solid and a supernatant solution substantially free of particles comprising zero-valent iron and iron oxide; and (b) re-suspending the settled solid to provide an aqueous suspension comprising activated iron media.

As used herein, the term "activated iron media" refers to the iron media product resulting from the settled solid. The activated iron media comprises zero valent iron, ferrous iron, and iron oxide. Zero valent iron and iron oxide are present at least in part in the suspension and settled solid as particulates (i.e., grains). The activated iron media is generated by intimate contact of zero valent iron, ferrous iron, and iron oxide on settling from the aqueous suspension of these components. After a predetermined time, resuspension of the settled solid (i.e., disruption of the intimate contact of these components as a consequence of their settling) provides an aqueous suspension comprising the activated iron media. As used herein, the terms "activated iron media," "super-reactive iron, "super-reactive iron oxide," "super-reactive magnetite," "super-reactive $Fe_3O_4$," and "sp.r. $Fe_3O_4$," are used interchangeably.

The term "substantially free of particles of zero-valent iron and iron oxide" refers to a supernatant solution above a settled solid that includes less than about 5% by weight of the particles of zero-valent iron and iron oxide. In certain embodiments, the supernatant solution includes less than about 1% by weight of the particles of zero-valent iron and iron oxide. In other embodiments, the supernatant solution includes less than about 0.1% by weight of the particles of zero-valent iron and iron oxide. Due to the significantly greater density of the settled solids relative to the aqueous solution, settling generally occurs rapidly and essentially completed to provide a supernatant solution that is substantially free (e.g., <0.01% by weight) of the particles of zero-valent iron and iron oxide.

In certain embodiments, settling the suspension comprises settling by gravity. In other embodiments, settling the suspension comprises centrifugation.

The activated iron media is prepared from and includes zero valent iron, ferrous iron, and iron oxide. In certain embodiments, the iron oxide comprises magnetite. In certain embodiments, the iron oxide is generated by a reaction of the zero-valent iron and ferrous iron. In other embodiments, the iron oxide is an added iron oxide. In certain embodiments, the activated iron media comprises a Fe(II)-enriched magnetite.

In another aspect, the invention provides an activated iron media, which is obtainable by the method of the invention.

In a further aspect of the invention, a method for removing or reducing a concentration of a contaminant in a fluid using the activated iron media is provided. In one embodiment, the method comprises:

(a) settling an aqueous suspension comprising a zero-valent iron; ferrous iron; and an iron oxide to provide a settled solid and a supernatant solution substantially free of particles comprising zero-valent iron and iron oxide;

(b) re-suspending the settled solid to provide an aqueous suspension comprising activated iron media; and (c) contacting a fluid comprising a contaminant with the aqueous suspension comprising activated iron media.

In the above method, step (a) can be considered to be a charging phase (i.e., generating or regenerating activated iron media by intimate contact of the iron components) and step (c) can be considered the reaction phase (i.e., contaminant removal or concentration reduction).

In one embodiment, the method further comprises step (d): settling the aqueous suspension to provide a supernatant effluent and a settled solid. In this embodiment, the method can further comprise step (e): re-suspending the settled solid in the effluent. It will be appreciated that the effluent can be removed from the activated iron media as decontaminated, removed for further processing, or continued to be treated by one or more charging/reacting cycles. Thus, in certain embodiments, the methods includes repeating steps (d) and (e) one or more times. As noted above, the method can also include step (f): removing the supernatant effluent from the settled solid.

In the above methods, steps (a) and (b) can be repeated one or more times. The number of cycles will depend on the desired level of removal or concentration reduction of contaminants desired, the nature of the contaminants themselves, and the extent to which the fluid is contaminated.

The methods of the invention can be carried out in a variety of embodiments including multiple stages (e.g., single or multiple reactors, external settling tanks). In certain embodiments, steps (a)-(f) are carried out in a single reactor. In other embodiments, steps (a) and (d) are carried out in a settling tank separate from the first reactor. In certain embodiments, the contents of the first reactor are constantly stirred during steps (b), (c), and (e). In embodiments in which steps (a) or (d) are performed in a settling tank, the method includes transferring at least a portion of the suspension from a reactor to the settling tank. In embodiments in which steps (b) or (e) are performed in a first reactor, the method includes transferring a settled solid from the settling tank to the first reactor, for example steps (a) or (d) are performed in a settling tank. As noted above, steps (a)-(e) in each of two or more reactors.

In the methods of the invention, it was advantageously found that selenate ($SeO_4^{2-}$) was selectively removed from fluids that included selenate and nitrate contaminants.

The following description is provided to illustrate the invention.

Hybrid Zero Valent Iron Composites

A zero valent iron [ZVI/FeOx/Fe(II)] composite (also referred to as a hybrid zero valent iron composite or hybrid ZVI composite) includes a reactive solid [zero valent iron (ZVI) and iron oxide (FeOx)] and a secondary reagent [ferrous iron (Fe(II))]. The reactive solid may be transformed into a reactive material effective for removing and/or reducing the concentration of contaminants in a fluid. The composite is a particle having a core comprising zero-valent iron and a layer associated with the core that includes the reactive material.

An advantage of the hybrid ZVI composite is the sustainability of a high level of activity and improved lifetime, particularly in comparison to compositions or systems that include zero valent iron alone.

The reactive composite can be produced by an activation process. The activation process may involve oxidizing at least a portion of a zero-valent iron so as to form an iron oxide and exposing the iron oxide to dissolved ferrous ion to form the reactive material. The ferrous ion may adsorb onto and become a part of the composite. As described herein, the reactive composite may be produced in situ as part of a contaminant removal process.

Hybrid zero valent iron treatment systems that utilize hybrid ZVI composites are described in US 2011/0174743 and US 2012/0273431, each expressly incorporated by reference in its entirety.

Activated Iron Media: Super-Reactive Magnetite

In one aspect, the invention provides activated iron media. Without wishing to be bound by theory, it is believed that magnetite particles are responsible for a dramatic increase in the reactivity for selenate reduction in a hybrid ZVI composite compared to a ZVI/Fe(II) mixture in the absence of magnetite particles. For example, referring to FIG. 1A, magnetite particles 1000 can serve as electron shuttle or carrier in a hybrid ZVI composite, such that as magnetite particles 1000 come into contact with or harbor on ZVI grains 1050 (which include Fe(II) 1100), electrons from ZVI grains 1050 transfer to the magnetite particles 1000, and the electron-enriched magnetite 1150 then serves as a reaction site where the electrons could be imparted to the oxyanions such as selenate and nitrate. In some embodiments, the electron-enriched magnetite is Fe(II)-enriched.

Referring to FIG. 1B and FIG. 2A, in a fully fluidized reactor system, magnetite particles 1000, ZVI grains 1050, and Fe(II) 1100 exist in suspension and would randomly collide with one another as the particles and grains move with the bulk liquid flow. Their surface conditions are under the influence of the bulk aqueous chemical conditions (e.g., pH, dissolved oxygen, various reactive/inhibitive oxyanions). Such physical and chemical conditions result in inefficient transfer of electron from ZVI to magnetite particles to generate electron enriched magnetite 1150.

Referring to FIG. 1C, without wishing to be bound by theory, it is believed that a more efficient method of transforming magnetite into a super-reactive magnetite (also referred to herein as a super-reactive $Fe_3O_4$ or sp.r.$Fe_3O_4$ in the figure) is to allow an increased number of magnetite particles 1000 to come into close contact with ZVI grains 1050 and Fe(II) 1100 for a sufficient time to generate the super-reactive magnetite 1150, with limited interference from other aqueous factors or constituents (e.g., such as dissolved oxygen (DO), other oxidants, etc.). The close contact between magnetite particles 1000 with ZVI grains 1050 could be achieved by allowing the hybrid zero-valent iron composite (i.e., fresh ZVI having a clean surface or magnetite-coated ZVI 1050, magnetite particles 1000, and surface-bound Fe(II) 1100) to settle to form a compact sludge blanket. The close contact can be achieved using an external settling tank where the sludge could settle to form a compact sludge blanket before being recycled to the mixing reactor. The close contact can also be achieved during the settling phase if the reactor is operated in a sequential batch mode.

As used herein, "super-reactive iron oxide" ("sp.r. $Fe_3O_4$" or "super-reactive magnetite") refers to an iron oxide (e.g., magnetite) population in a hybrid ZVI composite (e.g., activated iron media) that includes a relatively high concentration of an electron-enriched iron oxide.

Thus, generating a super-reactive iron oxide (e.g., magnetite) can include providing an aqueous suspension including a zero-valent iron, ferrous iron, and an iron oxide; and settling the suspension for a sufficient amount of time to provide a supernatant solution and a settled solid. Over time, the settled solid generates a super-reactive iron oxide. The settling can occur via gravity. In some embodiments, settling can be accelerated through mechanical means, such as via centrifugation.

Once the super-reactive iron oxide has been generated, the settled solid can be resuspended in a supernatant solution that can include a fluid to be treated. The settling and the resuspension can occur one or more times, such that an iron oxide can be reactivated by the close proximity of zero-valent iron and ferrous iron. Once the fluid is treated, the zero-valent iron, ferrous iron, and iron oxide can settle again while the supernatant solution is removed.

Reactor Systems

Exemplary reactor systems useful in the methods of the invention include those described in US 2011/0174743 and US 2012/0273431, each expressly incorporated herein by reference in its entirety. Single-stage and multiple-stage reactor systems can be used.

In some embodiments, the system is a single-stage reactor system and includes a single reactor (e.g., a fluidized bed reactor). In other embodiments, the system is a multiple-stage reactor system and includes two or more reactors. The systems may further include one or more of the following: an internal solid/liquid separating zone (e.g., settling zone), an aerating basin, a settling basin, and a filtration bed.

A representative single-stage reactive system useful for carrying out the methods of the invention is schematically illustrated in FIG. 2A. Referring to FIG. 2A, reactor system 100 includes reactor 110 having reactive zone 111 in fluid communication with internal settling zone 114. In certain embodiments, reactive zone 111 is maintained near neutral pH. In certain embodiments, settling zone 114 uses gravitational forces to separate solids from liquids. In certain embodiments, settling zone 114 is positioned towards the top of reactor 110 (as shown in FIG. 2A). Communication between settling zone 114 and reactive zone 111 is via inlet 115. Effluent 125 is removed from the top region of settling zone 114 to aerating basin 116.

Reactor 110 includes central conduit 113, which provides mixing (e.g., convection motion).

In certain embodiments, reactor 110 operates in part as fluidized bed reactor that employs motorized stirrer 138 in conjunction with central conduit 113 to create circular flow within reactor 110 and provides mixing between wastewater 124 and particles 1000, 1050, 1100, and 1150. Settling zone 114 provides for solid-liquid separation and return of the solid particles into fluidized zone 112. As used herein, the term "fluidized bed reactor" refers to a reactor that provides a flow of reactive solids (e.g., 1000, 1050, 1100, and 1150) within the reactor so as to provide mixing between the solids and wastewater to facilitate reaction. In certain embodiments, the reactor includes a stirrer and operates as a stirred tank reactor. Flow within the reactor can be established by conventional methods known in the art for creating flow in a fluidized bed reactor. As shown in FIG. 2A, single-stage reactor system 100 includes fluidized zone 112, internal settling zone 114, aerating basin 116, settling basin 118, and sand filtration bed 120.

Within the reactor, fluidized zone 112 is the primary reactive space where solid particles 1000, 1050, 1100, and 1150 are mixed with wastewater 124 and secondary reagent 126, and where various physical-chemical and biological processes responsible for toxic metal and nitrates removal occur.

Settling zone 114 allows particles to separate from water and be returned in fluidized zone 112. For high density particles, an internal settling zone with a short hydraulic retention time is sufficient for complete solid/liquid separation. This eliminates the need of a large external clarifier and a sludge recycling system.

Aerating basin 116 serves at least two purposes: (1) to eliminate residual secondary reagent in effluent 125 from fluidized zone 112; and (2) to increase the dissolved oxygen level. For a single-stage reactor, effluent from the fluidized zone will typically contain a certain amount of secondary reagent. Oxidation of secondary reagent will consume alkalinity and therefore will lower the pH. In some embodiments, to accelerate oxidation of secondary reagent, aerating basin 116 is maintained at a pH of above 7.0. Chemicals such as $Ca(OH)_2$, NaOH, and $Na_2CO_3$ may be used for pH control.

Settling basin 118 serves to remove flocculent formed in aerating basin 116. Flocculent that has settled to the bottom of basin 118 can be returned as sludge 132 to fluidized zone 112 and transformed by secondary reagent 126 into dense particulate reactive solid.

Sand filtration bed 120 can be used to further polish intermediate treated water 133 before discharge as treated water 134.

Post-reactor stages (e.g., aeration-settling-filtration) may not be needed under certain system operating conditions.

Referring to FIG. 2A, the system can further include wastewater pump 136, reagent pumps 137, auxiliary reagent 127 (e.g., HCl), air 128, and pH control chemical 130.

Figure 2B:
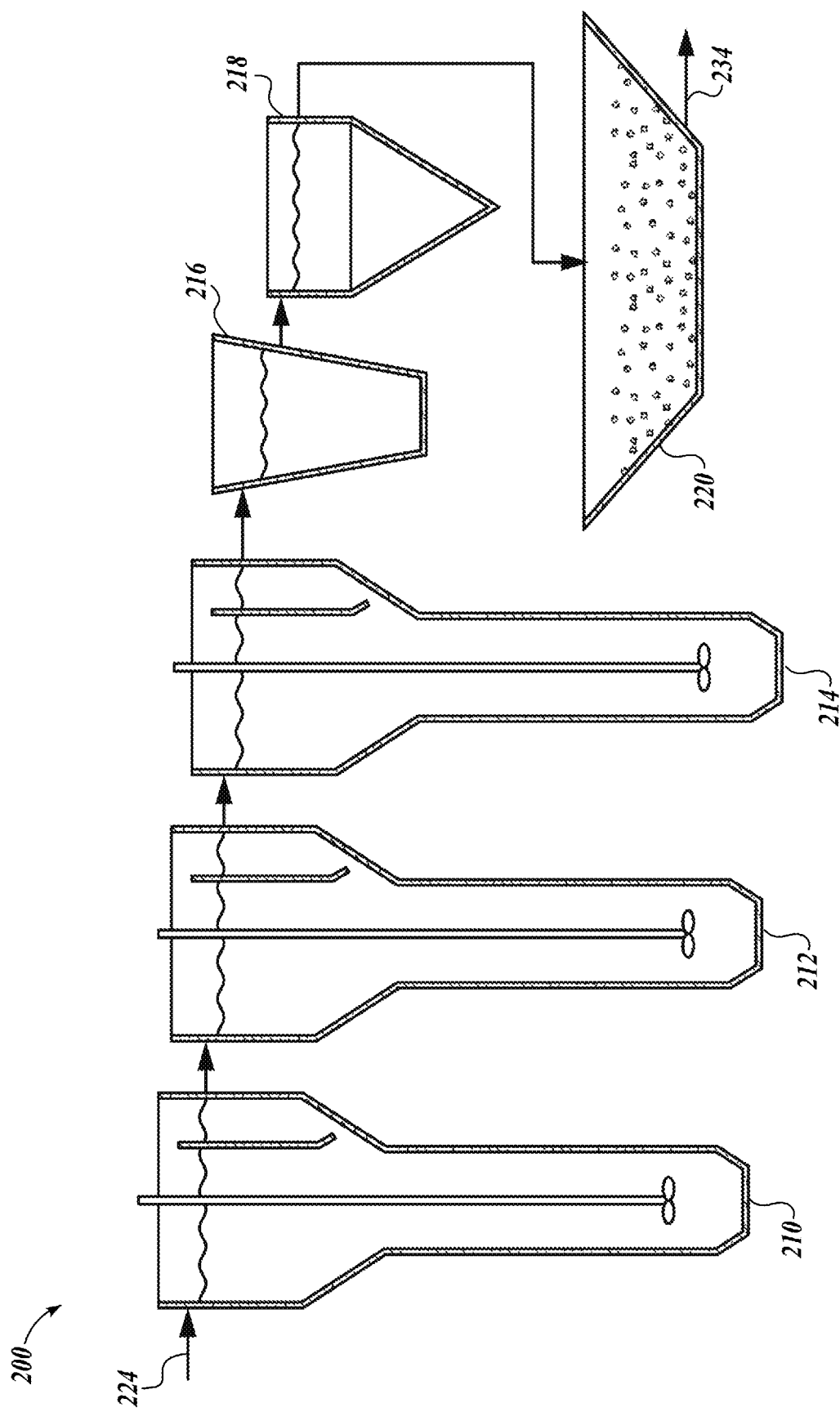
FIG. 2B is a schematic illustration of a representative reactor system that includes multiple reactors.

A representative three-stage reactive system useful for carrying out the methods of the invention is schematically illustrated in FIG. 2B. Referring to FIG. 2B, reactors 210, 212, and 214 (e.g., fluidized bed reactors) are combined to provide multi-stage treatment system 200. In certain embodiments, each reactor (i.e., stage) maintains its own reactive solid. That is, the solids are separated in each stage. In order to achieve a separate solid system, each stage may have its own internal solid-liquid separation structure (e.g., such as settling zone 114 as shown in FIG. 2A).

Depending on operating conditions in reactors 210, 212, and 214, wastewater 224 characteristics, and discharge 234 standards, post-reactor stages (aeration unit 216, settling basin 218, filtration bed 220) may not be necessary. Although a multi-stage reactor system is more complex and may result in a higher initial construction cost, a multi-stage reactor system can have several advantages.

A multi-stage system can achieve higher removal efficiency than a single-stage system under comparable conditions. Further, the FGD wastewater may contain certain chemicals (e.g., phosphate and dissolved silica) detrimental to the reactivity of the solids. A multi-stage system may intercept and transform these chemicals in the first stage and thus reduce the subsequent stages to the negative impact of the detrimental chemicals. As such, a multi-stage configuration can be more stable and robust.

A multi-stage configuration facilitates the control of nitrate reduction. In a single-stage system, because of the presence of dissolved oxygen in raw wastewater, operating the system in a rigorous anaerobic environment is difficult. In a multi-stage system, the first stage can effectively remove virtually all dissolved oxygen and, as a result, subsequent stages can be operated under a rigorous anaerobic environment.

A multi-stage system also allows for flexible control of different chemical conditions in each individual reactor. The chemical conditions in each reactor can be controlled by adjusting the pumping rate of supplemental chemicals and adjusting aeration. A multi-stage system can be operated in a mode of multiple feeding points. Each stage can be operated under different pH and dissolved oxygen conditions.

A multi-stage system will typically lower chemical consumption. In a single-stage complete-mixed system, secondary reagent in the reactor is desirably maintained at a relatively high concentration in order to maintain high reactivity of reactive solids. As a result, residual secondary reagent in the effluent will be high. This means that more secondary reagent will be wasted and more neutralizer (e.g., NaOH or lime) consumption will be required to neutralize and precipitate the residual secondary reagent in the effluent. As a result, more solid sludge will be produced and waste disposal cost will increase. In a multi-stage system, residual secondary reagent from the first stage can be used in the second stage. In this case, secondary reagent may be added in a way that conforms to its actual consumption rate in each stage. As a result, it is possible to control residual secondary reagent in the effluent in the final stage to be much lower than the one in a single-stage system.

Sequential Batch Activated Iron Water Treatment System

Referring to FIG. 2B, a sequential batch activated iron water treatment system may include one or more activated iron reactors (210, 212, 214) and an optional post-treatment units such as an aeration unit 216, a settling basin 218, and a filtration bed 220. Each reactor can maintain its own reactive solid. That is, the solids are separated in each reactor. In order to achieve a separate solid system, each reactor may have its own internal solid-liquid separation structure.

In some embodiments, a sequential batch activated iron water treatment system may or may not need a pretreatment system before the activated iron reactor stage, which can be determined by the incoming raw wastewater (224). For example, a pretreatment system can remove excess total suspended solid in an incoming wastewater. In some embodiments, when the incoming wastewater carries a high concentration of salts and has an acidic or basic pH, pretreatment can decrease the salt concentration and adjust the pH to near neutral range.

The number of reactors can be decided by the treatment and operational needs. For example, when treating mine drainage pond water, a single reactor can be sufficient for intermittent treatment of the wastewater. In some embodiments, if the wastewater stream is continuous, two or more reactors can be used.

The activated iron reactors can remove contaminants and impurities through controlled chemical processes. Within an activated iron reactor, zero-valent iron powder can be consumed as wastewater is being treated. The concentration of zero-valent iron and iron oxide in the reactor can have a range from 10 g/L to about 300 g/L depending on specific needs. An Fe(II) source (e.g., $FeSO_4$) can be added to maintain high reactivity of ZVI powder. Surface agitation and aeration of the wastewater can be carefully controlled (i.e., artificially suppressed or enhanced depending on the treatment needs). Dissolved Fe(II), pH, dissolved oxygen (DO), and oxidation redox potential (ORP) can be monitored.

The post-treatment unit can further polish the treated wastewater from the activated iron reactors. The treated wastewater from the activated iron reactors can carry dissolved iron; dissolved oxygen level could be zero; and the residual turbidity can be high. To further improve treated wastewater quality, post-treatment can be performed. For example, an aeration basin 216 can be used to remove residual dissolved iron and re-oxygenated the water before discharge. A filtration bed (sand or membrane microfilter) 220 can be used to remove any residual suspended particles or turbidity from the water and further improve the treated wastewater's quality. In some embodiments, post-treatment is not needed depending on operating conditions in each of the reactors, incoming wastewater 224 characteristics, and discharge 234 standards.

In operation, a sequential batch activated iron water treatment system can maximize generation of super-reactive hybrid zero-valent iron composite by operating the one or more activated iron reactors in a batch mode, where a sequence of different operational phases is cycled through a given reactor.

Figure 3A:
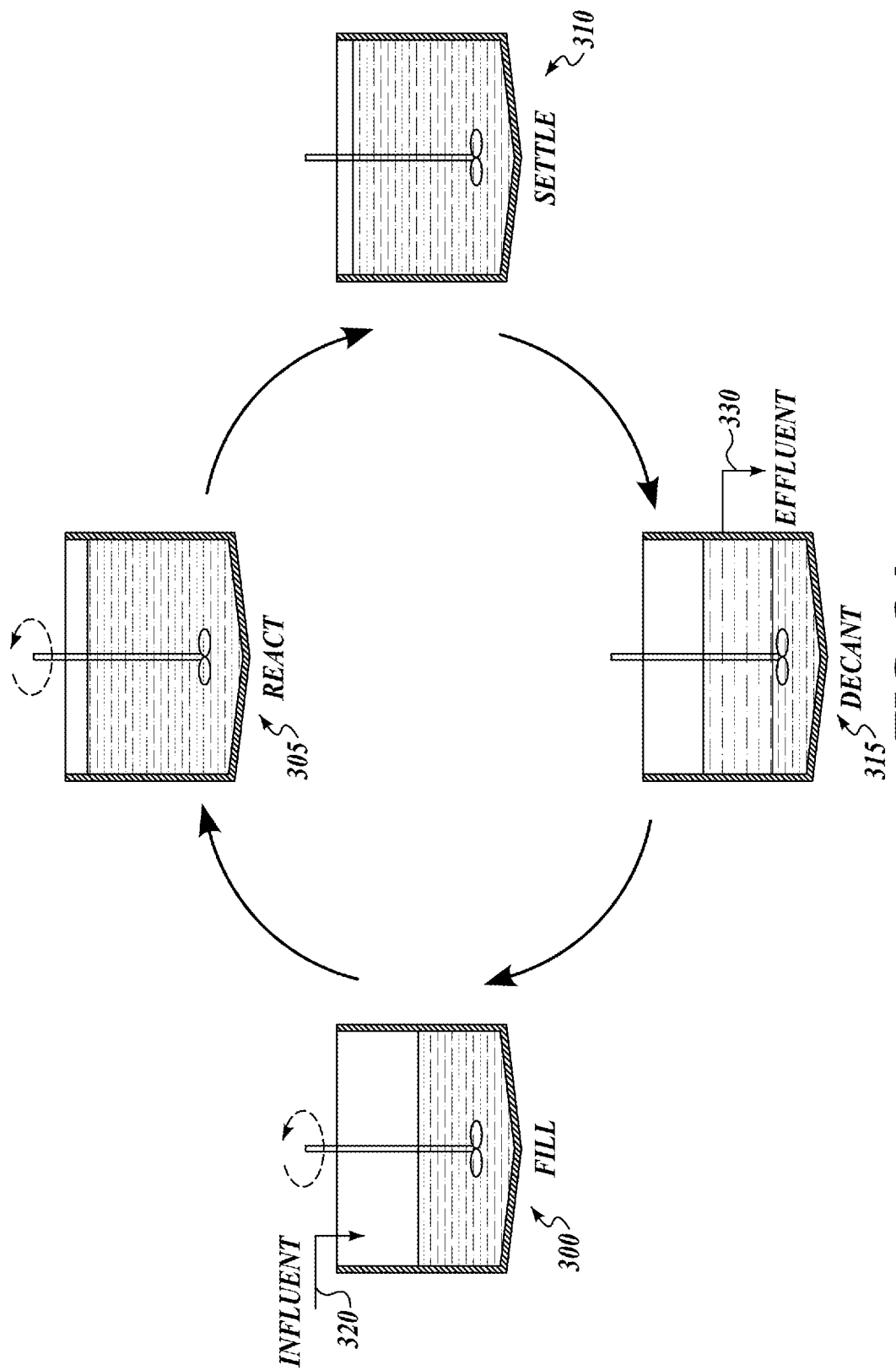
FIG. 3A is a schematic illustration of operational phases (fill, react, settle, decant) in a representative sequential batch activated iron reactor.

Referring to FIG. 3A, the sequence of operational phases include a fill phase 300, a reaction phase 305, a settling phase 310, and a decant phase 315. In fill phase 300, a reactor is filled with a fluid 320 to be treated (i.e., an incoming wastewater) and a Fe(II) reagent is optionally added to the reactor. The reactor is then stirred in a reaction phase 305 to allow reaction of contaminants in the fluid with the hybrid zero-valent iron composite, which can include a super-reactive iron oxide. The stirring is then stopped in a settling phase 310 to settle (i.e., precipitate) the hybrid zero-valent iron composite to regenerate a super-reactive iron oxide. The treated fluid 330 is then removed from the reactor in decant phase 315, leaving the settled hybrid zero-valent iron composite including the super-reactive iron oxide in the reactor. The settled hybrid zero-valent iron composite can then be used in further fluid treatment with a new batch of fluid. The removed treated fluid can be subjected to optional post-treatment processes.

In some embodiments, instead of removing the treated fluid from the reactor in decant phase 315, reaction phase 305 can be repeated directly after settling phase 310, such that the fluid is stirred again with a hybrid zero-valent iron composite that includes a regenerated super-reactive iron oxide. The stirring can be stopped after a period of time so that the reactor can enter settling phase 310. Reaction phase 305 and settling phase 310 can be repeated one or more times before the treated fluid is removed from the reactor in decant phase 315.

Figure 3B:
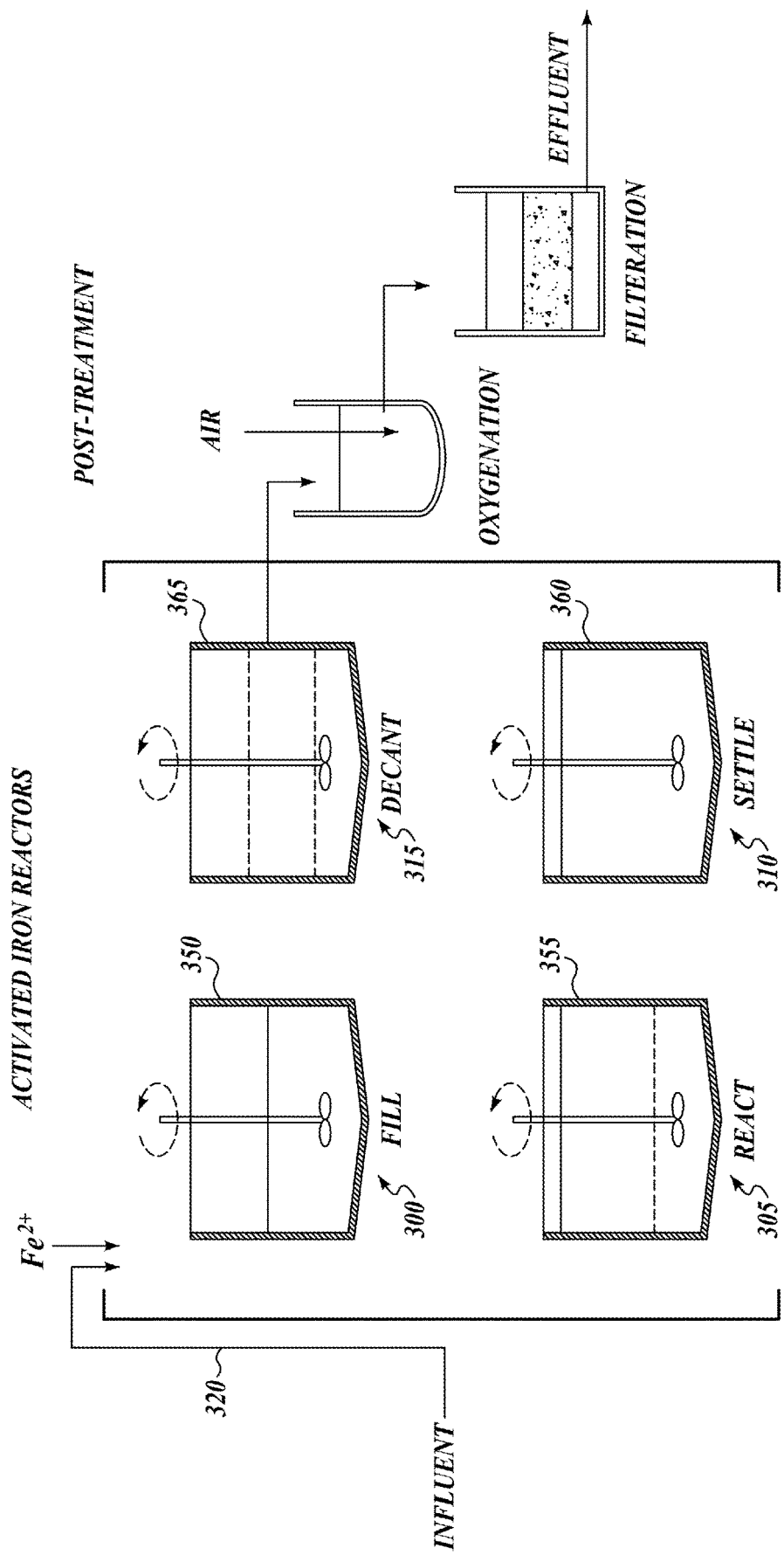
FIG. 3B is a schematic illustration of a sequential batch activated iron system having four activated iron reactors. As shown, each reactor is at a different operational phase (fill, react, settle, decant).

Referring to FIG. 3B, in some embodiments, a sequential batch activated iron water treatment system can include a plurality of batch activated iron reactors 350, 355, 360, and 365. Each of the reactors can be at the same or a different operational phase as a reactor cycles through the operational phases. For example, referring again to FIG. 3B, reactor 350 can be at a fill phase, reactor 355 can be at a reaction phase, reactor 360 can be at a settling phase, and reactor 365 can be at a decant phase. In each reactor, the reaction and settling phases can be repeated one or more times before a treated fluid is decanted from the reactor. The treated fluid can then be subjected to post-treatment processes.

In some embodiments, instead of performing all operational phases within a given reactor, the phases can occur in different reactors or tanks. For example, the fill phase and reaction phase can occur in a reactor, while the settling phase and decant phase can occur in a settling tank that is separate from the reactor. For example, after a fluid has been reacted for a period of time with a super-reactive hybrid zero-valent iron composite in a reactor, at least a portion of the suspension of fluid and hybrid zero-valent iron composite can be transferred from the reactor to a settling tank, the suspension can be allowed to settle to precipitate out the hybrid zero-valent iron composite, and the supernatant fluid can be decanted from the settling tank. The precipitated hybrid zero-valent iron composite can regenerate a super-reactive iron oxide as the zero-valent iron, Fe(II), and iron oxide (e.g., magnetite) are brought to close proximity in the form of a settled sludge in the settling tank. The precipitated hybrid zero-valent iron composite that includes the super-reactive iron oxide can then be transferred from the settling tank to a reactor for contaminant removal for a new batch of fluid.

In some embodiments, a fluid and a precipitated hybrid zero-valent iron composite that includes a regenerated super-reactive iron oxide can be resuspended in the settling tank or in a reactor. The resuspended fluid and hybrid zero-valent iron composite can be stirred for a period of time to allow reaction of contaminants with the super-reactive hybrid zero-valent iron composite. The suspension can be allowed to settle in a settling tank or a reactor. In some embodiments, the resuspension and the settling phases can be repeated one or more times before decanting a treated fluid from a settling tank or a reactor.

The size of a sequential batch activated iron water treatment system can depend on the reaction time required for treating specific wastewater to the required effluent quality. For a sequential batch activated iron reactor water treatment system, reaction time can be calculated as the combined duration of fill phase and reaction phase. The reaction time can range from 5 minutes or more to 120 minutes or less.

The sequential batch activated iron water treatment system can have a lower construction cost, greater operating and maintenance simplicity and flexibility, and enhanced contaminant removal compared to conventional activated sludge wastewater treatment technologies that are based on steady-state continuous flow operation.

Constant Stirred Tank Treatment System

Figure 4:
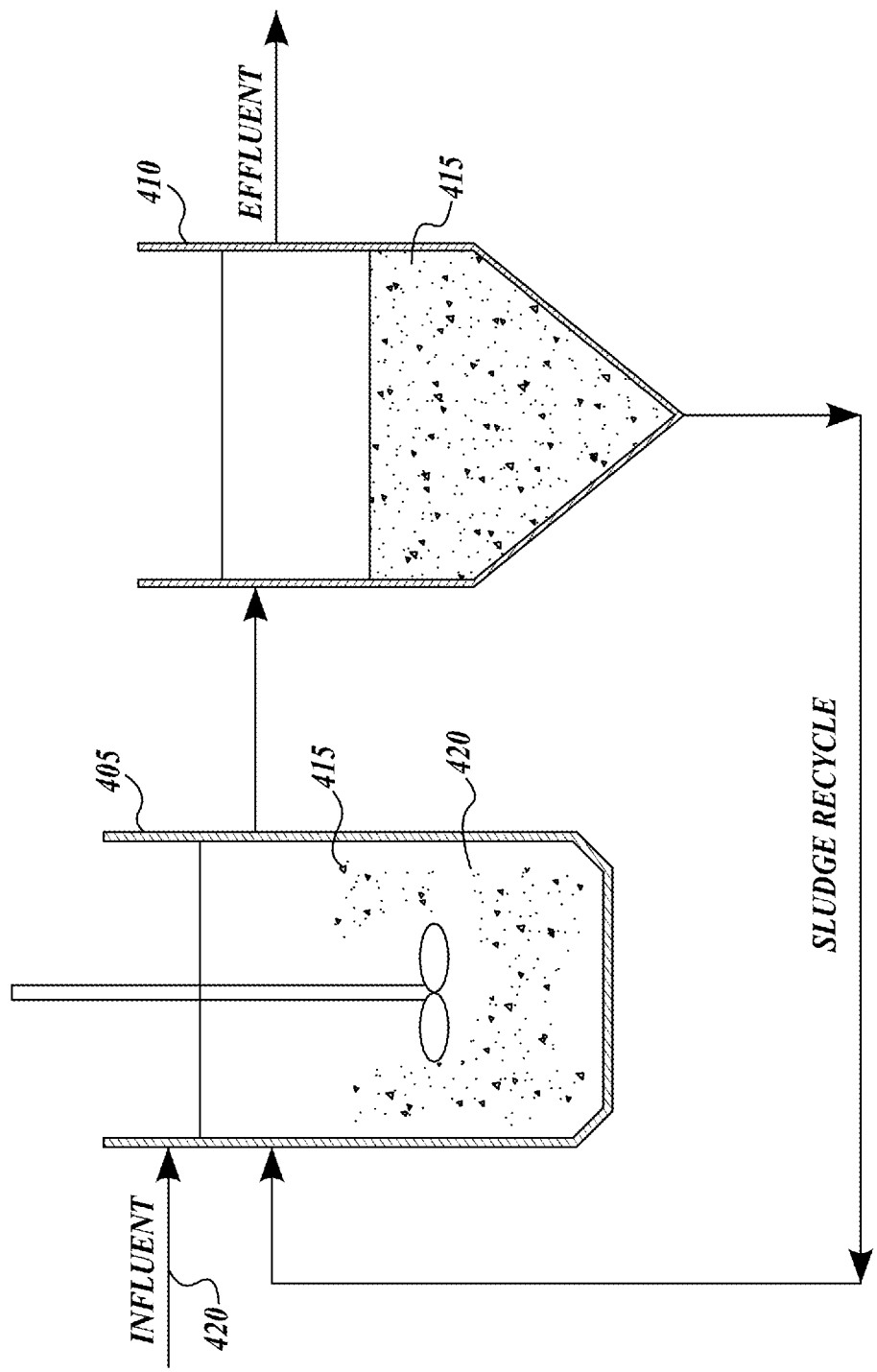
FIG. 4 is a schematic illustration of a representative continuously stirred tank activated iron reactor system with an external settling tank.

Referring to FIG. 4, the generation of super-reactive hybrid zero-valent iron composites can also be performed using a water treatment system that includes a constant stirred reactor 405 followed by a settling tank 410. Reactor 405 can include a constantly stirred suspension of a fluid to be treated 420 and a super-reactive hybrid zero-valent iron composite 415. At least a portion of the suspension can be periodically transferred from reactor 405 to settling tank 410 where the hybrid zero-valent iron composite can precipitate and be re-activated to generate a super-reactive hybrid zero-valent iron composite 415. Reactor 405 can be periodically refilled with a new fluid to be treated. The precipitated super-reactive hybrid zero-valent iron composite in settling tank 410 can be collected (sludge recycle) and returned to reactor 405 to reduce a contaminant in the new fluid to be treated. As in a sequential batch activated iron water treatment system, the constantly stirred water treatment system can have one or more reactors and one or more settling tanks connected to the reactors. In some embodiments, the reactors are placed in series, with one or more settling tanks placed at the end of the series of reactors. In some embodiments, the reactors can be placed in series, with one or more settling tanks placed after each or some of the reactors.

A hydraulic retention time (HRT) measures the average time wastewater spends within each reactor in a constant stirred tank treatment system. HRT can be determined by HRT=V/Q, where V is based on the entire volume of the reactor and Q is flow rate of the wastewater. Hydraulic retention time can include the settling time and decanting time as well as the volume ratio of supernatant decanted over the total reactor volume. In some embodiments, HRT can range from 30 min to 24 hr for a given wastewater treatment.

Treatable Contaminated Fluids

A variety of fluids may be treated according to embodiments discussed herein. Fluids to be treated typically include a contaminant, such as a toxic material (e.g., a toxic metal or metalloid). A fluid may include a fluid stream. A fluid stream may include a waste stream. A fluid may be aqueous, such as wastewater. A fluid may include an aqueous stream. A fluid may include an influent stream. A fluid may include an industrial waste stream. "Industrial waste stream" refers to liquid streams of various industrial processes. An industrial waste stream may be produced at any stage of a process. A waste stream may be wastewater, which herein refers to a primarily water-based liquid stream. Wastewater may be synthetic or simulated wastewater. A fluid may be flue gas desulfurization (FGD) wastewater. A fluid waste may include oil refinery waste. A fluid may be tail water of a mining operation. A fluid may include stripped sour water. The aqueous fluid may include a suspension. Other examples of fluids include tap water, deionized water, surface water, and groundwater. Wetlands may include a fluid. A fluid may be an influent stream. A fluid may have a near-neutral pH. A fluid may have a substantially neutral pH. A fluid may have a pH between 6 and 8. A fluid may include an oxidant or other additive, as discussed herein.

Various treatment flow rates may be employed. In some embodiments, flow rate is about, at most about, or at least about 50, 100, 200, 300, 400, 500, 600, 700, 800, 900, or 1000 gallons per minute (gpm), or more, or any range derivable therein. In some embodiments, fluid is treated at a rate ranging up to about 1000 gpm, such as in embodiments regarding treating FGD streams, such as in the context of power plant operation. In some embodiments, fluid is treated at a rate ranging up to and including 600 gpm, such as in embodiments regarding treating stripped sour water in the context of refinery plant operation.

Contaminants and Contaminant Removal

A variety of contaminants may be removed from a contaminated fluid using embodiments discussed herein. Contaminants that can be removed or their concentration reduced include metal compounds, metal ions, metal oxides, metalloids, oxyanions, chlorinated organic compounds, or combinations thereof.

The contaminant may be a toxic metal. Toxic metals exist in various dissolved forms (e.g., metal ions or various oxyanions). In FGD wastewater, for example, $Hg^{2+}$ is the main concern. Similarly, Cu and Zn may exist as metal ions ($Cu^{2+}$ and $Zn^{2+}$). For Se, selenate ($SeO_4^{2-}$) may be present in greatest quantities, but selenite ($SeO_3^{2-}$) or selenocyanate ($SeCN^-$) may be present. Arsenic may exist as arsenate ($AsO_4^{3-}$) or arsenite ($AsO_3^{3-}$). Chromium may exist as chromate ($CrO_4^-$). One or more of these ions may be considered a contaminant. Persons of skill in the art are familiar with the types of toxic metals that exist in contaminated fluids.

According to some embodiments, toxic metals are encapsulated within iron oxide crystalline (mainly magnetite powder) that are chemically inert and physically dense for easier solid-liquid separation and final disposal. Contaminants may be removed as precipitates. The contaminant may be reduced and then removed, such as when the contaminant is selenate, which may be reduced by employing methods described herein to selenite, which may be further reduced to elemental selenium and removed. As another example, iodate or periodate may be reduced to iodide by employing methods described herein.

Examples of contaminants include toxic materials, such as toxic metals. Non-limiting examples of toxic metals include arsenic, aluminum, antimony, beryllium, mercury, selenium, cobalt, lead, cadmium, chromium, silver, zinc, nickel, molybdenum, thallium, vanadium, and the like, ions thereof, and compounds thereof. Metalloid pollutants are also contemplated as contaminants, such as boron and the like, and ions thereof.

The contaminant may include oxyanion pollutants, such as borates, nitrates, bromates, iodate, and periodates, and the like.

Combinations of contaminants are also contemplated, such as combinations of arsenic, mercury, selenium, cobalt, lead, cadmium, chromium, silver, zinc, nickel, molybdenum, and the like, and ions thereof; metalloid pollutants such as boron and the like and ions thereof; and oxyanion pollutants, such as nitrate, bromate, iodate, and periodate, and the like. Alternatively or in combination, the contaminant may be dissolved silica. The contaminant may be a nitrite or a phosphate. A contaminant may be selenium or selenate. The contaminant may be hexavalent selenium. The contaminant may be copper (e.g., $Cu^{2+}$ or $Cu^+$). The contaminant may be a radionuclide.

The contaminant may be a chlorinated organic compound. The use of zero valent iron to treat chlorinated organics has been practiced in environmental remediation in the past. The known practices involve using zero valent iron as reactive media to build underground permeable reactive barriers to treat trichloroethylene (TCE) plumes in contaminated ground water. Zero valent iron as a reductant may react with these halogenated compounds and remove chlorine from the molecule (dechlorination). Some embodiments disclosed herein employ above-ground fluidized bed zero valent iron reactors to treat fluids contaminated with chlorinated organic compounds such as TCE.

More than one contaminant may be removed or reduced in concentration at the same time (e.g., simultaneously, or in the same reactor, or in the presence of a single reactive zone). In some embodiments, removing or reducing the concentration of a contaminant includes exposing a fluid including a contaminant to a treatment system that includes a zero valent iron, ferrous iron, an iron oxide (i.e., a zero valent iron composite) for a sufficient amount of time to remove or reduce a concentration of the contaminant in the fluid.

Reductions in contaminant concentration may be achieved by employing embodiments described herein. For example, the reduction in contaminant concentration may be greater than 70%. The reduction in contaminant concentration may be greater than 80%. The reduction in contaminant concentration may be greater than 90%.

Representative contaminants that can be removed or their concentration reduced include arsenic compounds, aluminum compounds, antimony compounds, beryllium compounds, mercury compounds, selenium compounds, cobalt compounds, lead compounds, cadmium compounds, chromium compounds, silver compounds, zinc compounds, nickel compounds, molybdenum compounds, thallium compounds, vanadium compounds, arsenic ion, aluminum ion, antimony ion, beryllium ion, mercury ion, selenium ion, cobalt ion, lead ion, cadmium ion, chromium ion, silver ion, zinc ion, nickel ion, molybdenum ion, thallium ion, vanadium ion, borates, nitrates, bromates, iodates, periodates, trichloroethylene, dissolved silica, and combinations thereof.

Activation of hybrid zero-valent iron composite (a mixture of ZVI, discrete magnetite, and some dissolved and surface adsorbed Fe(II)) to generate the activated iron media (super reactive iron oxide) and the higher reactivity of the activated iron media with respect to the reduction of oxyanions such as selenate are described below. Two types of experiments were conducted to evaluate the feasibility of super-reactive hybrid zero-valent iron composite in wastewater treatment: (1) sequential batch reactor (SBR) experiments; and (2) constant stirred tank reactor experiments in conjunction with an external settling basin and a sludge recycling process.

Sequential Batch Reactor Experiments

The SBR experiment used a fluidized-bed reactor without an internal settling zone having an effective reactor volume of 10 L. The wastewater was synthetic or actual wastewater from a flue-gas-desulfurization process.

An activated iron composite was prepared by adding 400 g of fresh ZVI (100 mesh) powder, 200 g of magnetite powder, and 10 liter deionized water into the reactor, followed by addition of 10 mL 1.0 M FeCl$_2$ solution into the reactor to make suspension of 1 mM Fe$^{2+}$. A mixer was turned on to completely stir and fluidize the solid media. The process, which lasted 24 h, was to activate the commercial magnetite powder. The commercial magnetite powder, which consisted of crystalline magnetite particles having a diameter of mostly under 1 um, could be covered with a thin surface layer of ferric oxide (e.g., maghemite γ-Fe$_2$O$_3$) as magnetite can be oxidized by oxygen when exposed to air. The activation process is to remove ferric oxide surface film, which is passive, from the magnetite particles with the assistance of ZVI and Fe(II).

The reactor was operated in sequential modes through the cycle of fill→react (mixing)→settling (also regenerating) →decanting (i.e., effluent discharging). Samples of mixture or supernatant were taken during the process and filtered for various analyses.

Selenium was analyzed using either an Ion Chromatography (IC) method (Dionex 500, AS22 column) or a Hydride Generation Atomic Absorption Spectroscopy (HG-AAS) (Perkin Elmer, AAnalyst400). The IC method has a minimum reliable reporting limit of 0.05 ppm (50 ppb) for selenate-Se. The HG-AAS method has a minimum reliable reporting limit of 0.5 ppb. Nitrate was analyzed using the IC method along with selenate analyses.

Trial 1A: Selenate and Nitrate Reduction by Super-Reactive Hybrid Zero-Valent Iron Composite (2 Hour Regeneration Time)

The wastewater composition was 25 mg/L Nitrate-N+ 12.5 mg/L Selenate-Se in deionized water.

For each cycle, the operation sequence had a fill phase, a mixing (i.e., reaction) phase, a settling phase, and a decanting phase. The fill phase was at T=0 min: 8 liter L of wastewater and 10 mL of 1 M FeCl$_2$ solution was added into reactor (before the experiment, the reactor was settled for 24 hr and 8 liter of supernatant was decanted; thus 2 liter of the activated iron slurry was present in the reactor; no selenate and nitrate were present initially in the reactor); feed wastewater samples were taken. The reaction phase was at T=0-120 min: a mixer was turned on and samples were taken at 12 min, 30 min, 60 min, and 120 min. The settling phase was at T=120-210 min: the mixer was turned off and samples were taken at 180 min. The decanting phase was at T=210-240 min: the mixer was turned off and 8 liters of supernatant was removed from the reactor.

During T=120-240 min, the hybrid zero-valent iron composite was settled to form a thick compact blanket at the bottom with minimum disturbance; thus the two hour period was intended to be the regeneration period to convert less reactive normal magnetite to super-reactive magnetite particles that is enriched in Fe(II).

Figure 5A:
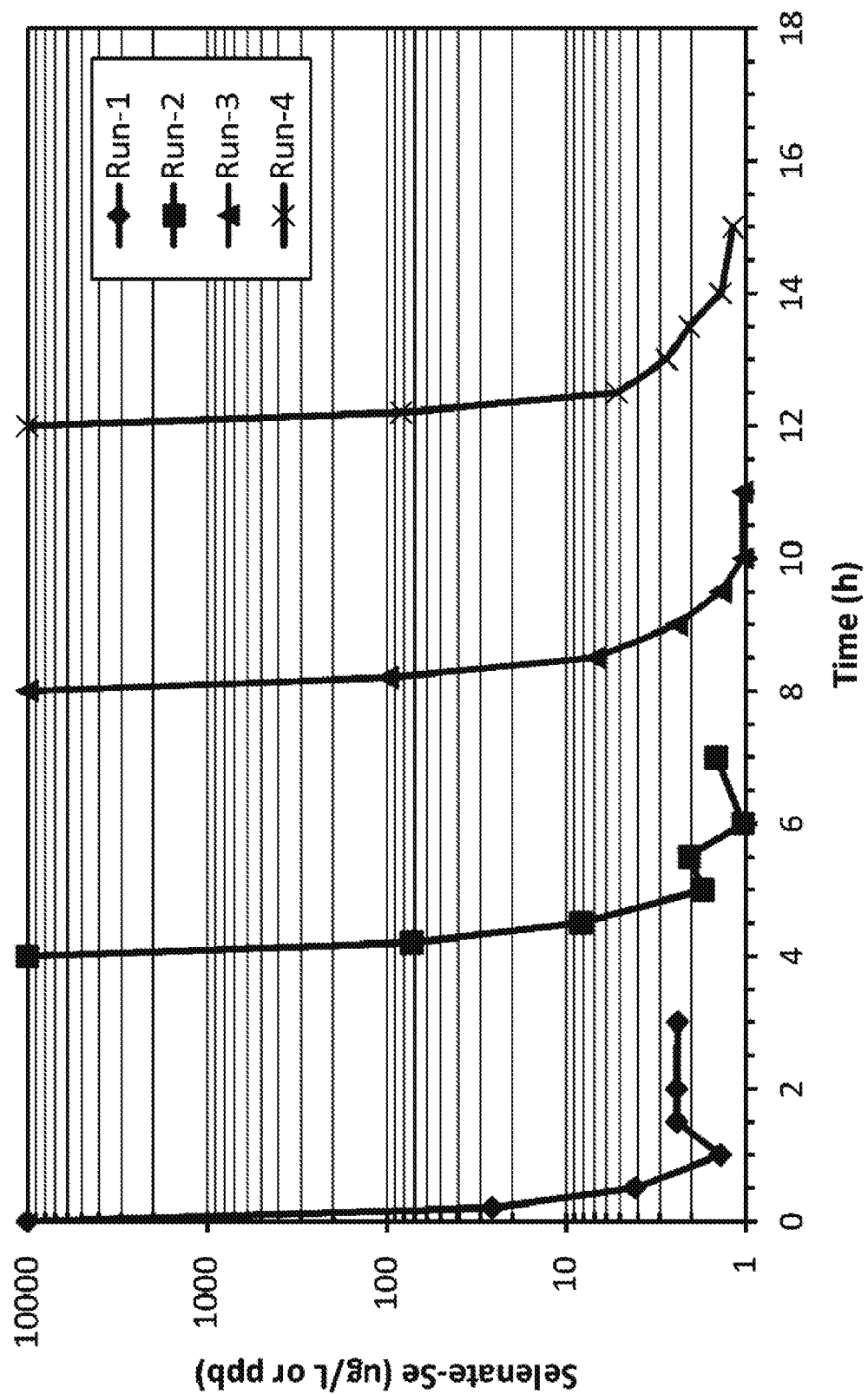
FIG. 5A is a graph showing selenate reduction over time in a sequential batch reactor system.
Figure 5B:
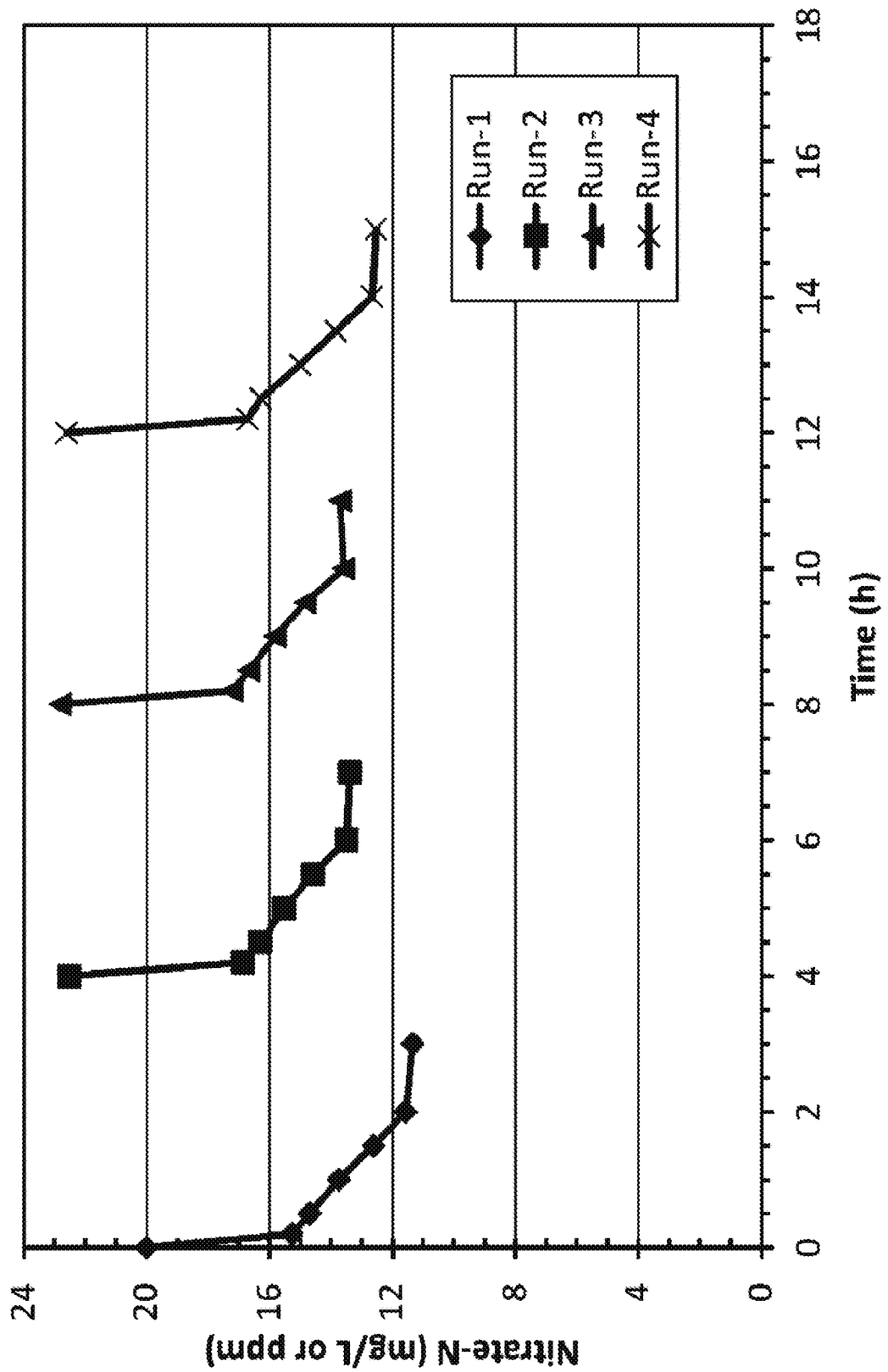
FIG. 5B is a graph showing nitrate reduction over time in a sequential batch reactor system.

FIG. 5A shows selenate reduction and FIG. 5B shows nitrate (bottom panel) reduction over time in a sequential batch activated iron reactor system. Four runs were conducted. Selenate was reduced by over 99.9% from 10,000 ug/L to below 10 ug/L in as short as 30 min. In contrast, only less than 30% of nitrate was reduced during the same period. Results from the four runs were similar, suggesting that the high reactivity of the activated iron composite after each settling mode could be sustained for selenate reduction for the system to be continuously operated as a SBR process.

Trial 1B: Selenate and Nitrate Reduction by Super-Reactive Hybrid Zero-Valent Iron Composite (Shortened Regeneration Time)

Trial 1A showed that a 2-hr settling time (i.e., regeneration time for producing super-reactive magnetite) was sufficient long to produce adequate super-reactive magnetite for rapid selenate reduction from 10 ppm to below 10 ppb. Trial 1B evaluates the impact of a shortened settling time on selenate reduction.

The test conditions of Trial 1B were similar to Trial 1A except that the regeneration duration (settling+decanting phases) was shortened from 2 hr to 1 hr in Run-2 and then to 0.5 hr in Run-3 and Run-4.

Figure 6A:
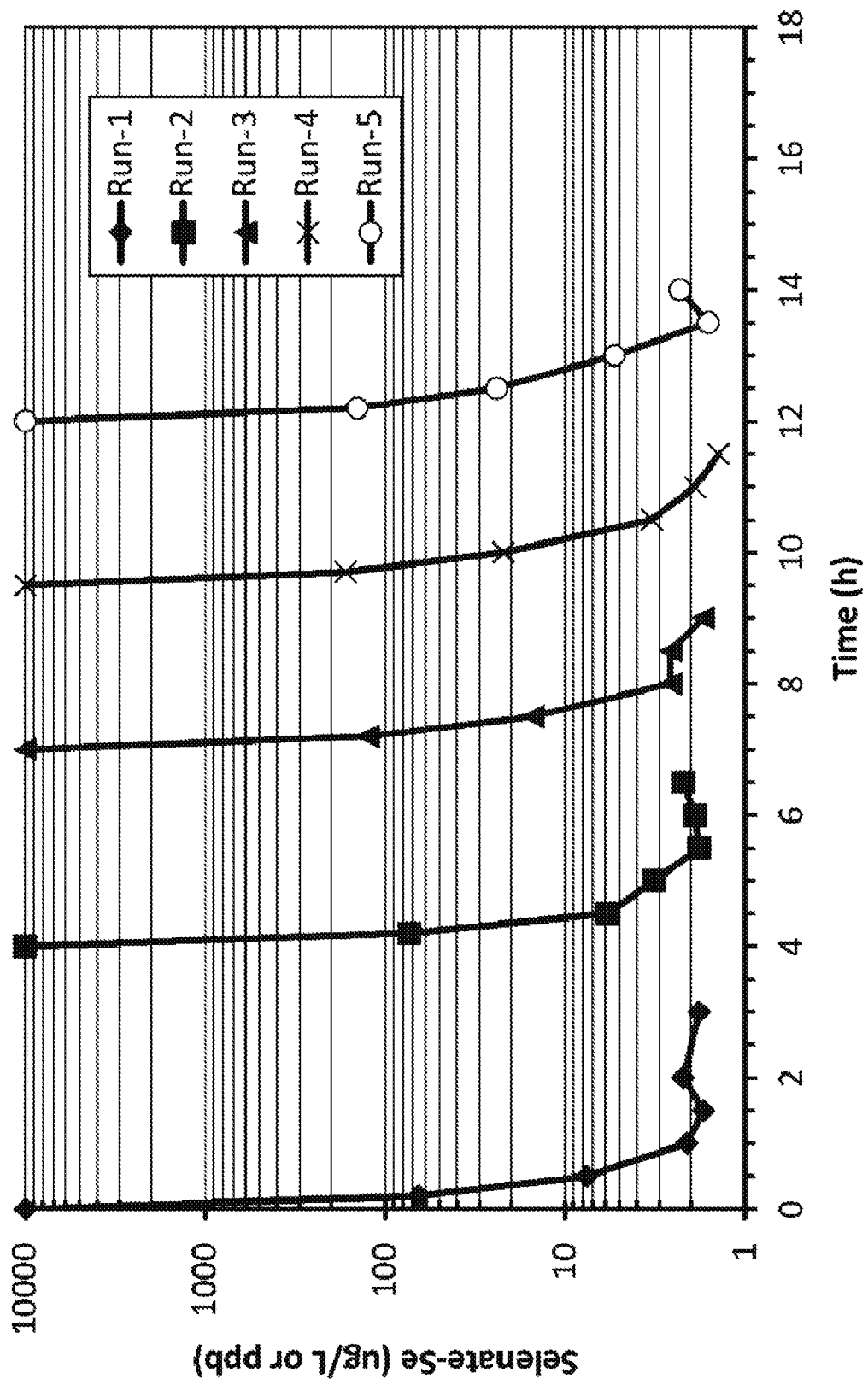
FIG. 6A is a graph showing selenate reduction over time in a sequential batch activated iron reactor system with different durations for a settling phase.
Figure 6B:
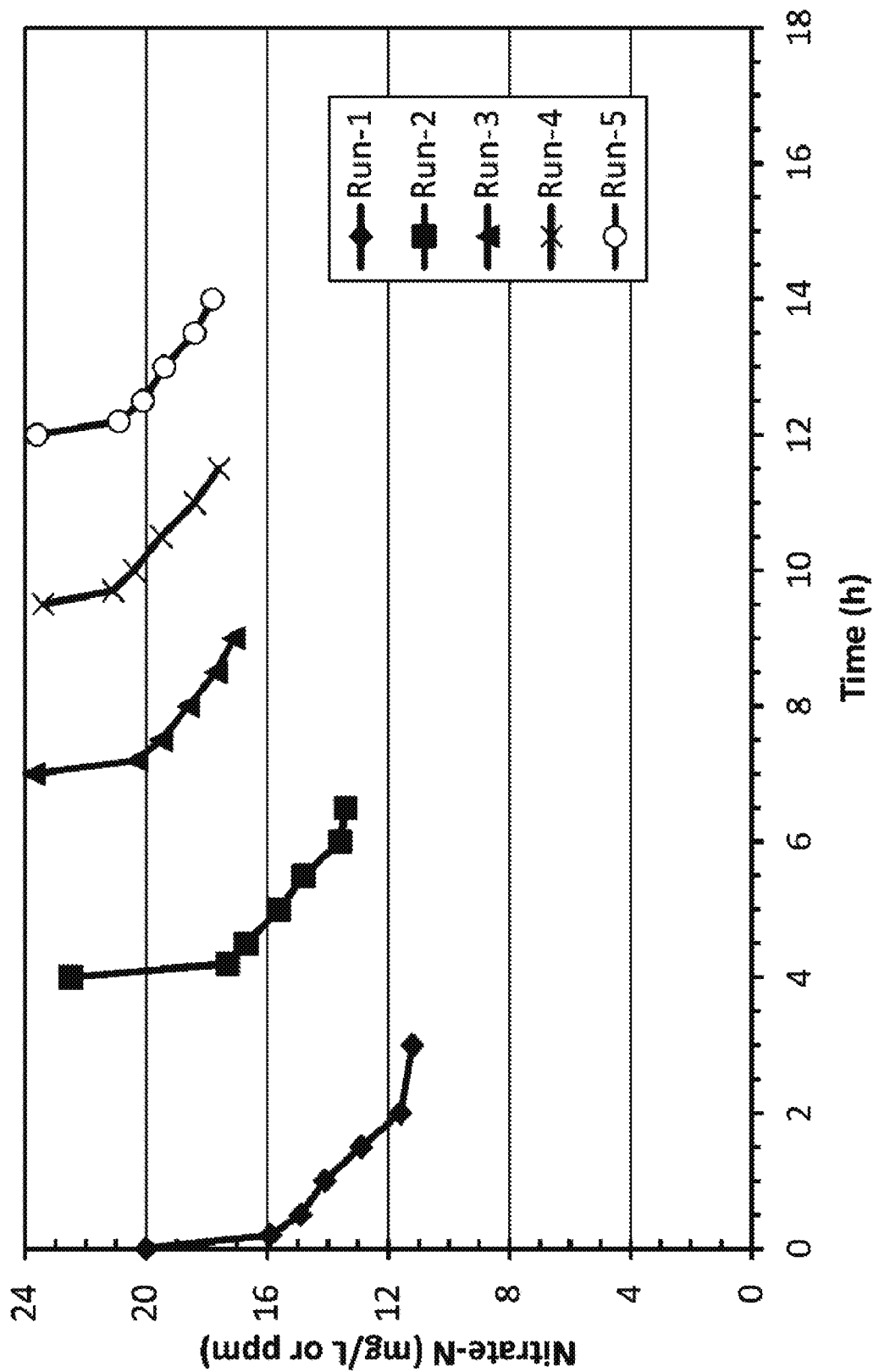
FIG. 6B is a graph showing nitrate reduction over time in a sequential batch activated iron reactor system with different durations for a settling phase.

FIG. 6A shows selenate reduction and FIG. 6B shows nitrate reduction over time in a sequential batch activated iron reactor system with different duration of settling phase. Settling+decanting time was shortened from 2 hr in Run-1 to 1 hr in Run-2 to 0.5 hr in Run-3 and Run-4.

The results showed that a settling time of 0.5 hr was sufficient to produce adequate super-reactive magnetite to support rapid reduction of selenate to a very low level in the subsequent treatment cycle.

Trial 1C: Selenate and Nitrate Reduction by Super-Reactive Hybrid Zero-Valent Iron Composite—Presence of Interfering Agents Trial 1C examines the impact of sulfate as an interfering factor on the treatment performance of the super-reactive hybrid zero-valent iron composite. In a hybrid ZVI system, selenate reduction was demonstrated to be significantly decreased in the presence of high sulfate concentration in the water. Sulfate is present in various concentrations in many industrial wastewaters. Therefore, the effect of sulfate ion on the generation and reactivity of super-reactive magnetite needed to be evaluated. In Trial 1C, sulfate of various concentrations was introduced as a potential interfering constituent in the wastewater.

The hybrid zero-valent iron composite and the reactor setup used in Trial 1A were also used in Trial 1C. The feed wastewater was prepared as 5 mg/L selenate-Se (added as $Na_2SeO_4$)+10 mg/L nitrate-N (added as $NaNO_3$)+300 (or 800, 1500) mg/L sulfate (as $Na_2SO_4$). For each new run, 8 liters of wastewater feed were added into the reactor that contained 2 liters of activated iron sludge sediment after decanting 8 liters supernatant (i.e., the treated effluent from the previous treatment cycle). 10 mL 1 M $FeCl_2$ was added to provide 1 mM $Fe^{2+}$ in the 10 L mixture. Samples were taken after mixing was started at 5, 15, 30, and 60 min. After 60 min, the mixing was stopped and the system entered the settling/regeneration mode for two hours. A second run was started with the same procedure.

The results (Table 1) showed that the presence of sulfate slowed down selenate reduction. Despite the inhibiting effect of sulfate, super-reactive hybrid zero-valent iron composite still achieved reduction of selenate from 5 ppm to below 0.05 ppm within 60 min even in the presence of 1500 mg/L sulfate. Achieving similar reduction of selenate with similar concentration of sulfate would typically require a two-stage hybrid zero-valent iron composite system with a total reaction time of no less than 6 hr. Therefore, the super-reactive hybrid zero-valent iron composite could still achieve a much faster selenate reduction even in the presence of substantial sulfate impurity. Interestingly, the presence of sulfate appeared to inhibit nitrate reduction more significantly than that of selenate. Less than 10% nitrate reduction was observed during the experiment. Therefore, the experiment demonstrated that the presence of sulfate could further increase the selectivity of super-reactive hybrid zero-valent iron composite toward selenate versus nitrate.

TABLE 1

Selenate and nitrate reduction over time in a sequential batch activated iron reactor in the presence of various sulfate concentrations in the water.

| Experiment | Time (min) | Selenate-Se (ppm) | $NO_3$—N (ppm) |
|---|---|---|---|
| With 300 ppm sulfate + 5 ppm Selenate-Se + 10 ppm Nitrate-N | | | |
| | 5 | 1.86 | 8.67 |
| | 15 | 0.59 | 8.54 |
| | 30 | 0.05 | 8.36 |
| | 60 | BDL | 8.23 |
| Second run | 5 | 2.46 | 9.35 |
| | 15 | 1.02 | 9.3 |
| | 30 | 0.1 | 9.06 |
| | 60 | BDL | 8.86 |
| With 800 ppm sulfate + 5 ppm Selenate-Se + 10 ppm Nitrate-N | | | |
| First run | 5 | 2.44 | 9.51 |
| | 15 | 1.16 | 9.39 |
| | 30 | 0.15 | 9.41 |
| | 60 | BDL | 9.28 |
| Second run | 5 | 2.87 | 8.96 |
| | 15 | 1.35 | 8.82 |
| | 30 | 0.28 | 8.72 |
| | 60 | 0.05 | 8.74 |
| With 1500 ppm sulfate + 5 ppm Selenate-Se + 10 ppm Nitrate-N | | | |
| First run | 5 | 2.3 | 9.62 |
| | 15 | 1.26 | 9.62 |
| | 30 | 0.15 | 9.48 |
| | 60 | 0.05 | 9.28 |
| Second run | 5 | 2.24 | 9.84 |
| | 15 | 1.45 | 9.75 |
| | 30 | 0.15 | 9.72 |
| | 60 | 0.04 | 9.55 |

BDL is a designation for "below detection limit."

Trial 1D: Selenate and Nitrate Reduction for Super-Reactive Hybrid Zero-Valent Iron Composite in Actual FGD Wastewater Trial 1D evaluates the feasibility of using super-reactive hybrid zero-valent iron composite for removing selenium from actual flue-gas-desulfurization wastewater.

FGD wastewater often contains high concentrations of various impurities and contaminants such as chloride, bromide, sulfate, borate, silicate, calcium, magnesium, manganese, etc. Removing contaminants from such a complex composition matrix can be difficult. The effectiveness of super-reactive hybrid zero-valent iron composite was evaluated using real FGD wastewater.

The same super-reactive hybrid zero-valent iron composite and the experimental setup used in Trial 1C was used for Trial 1D. Real FGD wastewater obtained from a coal-fired power plant was used. The main constituents of wastewater included 4943 mg/L chloride, 1082 mg/L sulfate, 84 mg/L borate, 72 mg/L dissolved silica as $SiO_2$, 2532 mg/L $Ca^{2+}$, 465 mg/L $Mg^{2+}$, 64 mg/L $Na^+$, and 22 mg/L $K^+$. The FGD wastewater was further contaminated with 23 mg/L nitrate-N and 2.6 mg/L selenate-Se. The water had a pH of 6.8.

Similar to the process used in Trial 1A, Trial 1D started with adding 8 liter raw FGD wastewater into the reactor that contained 2 liter of activated iron sludge. 10 mL 1 M $FeCl_2$ solution was added to make 1 mM $Fe^{2+}$ in the mixture. The reactor was then operated in the following sequential phases.

At T=0, fill the reactor 4 mixing (1-15 min)→settling (16-60 min)+sampling
→mixing (61-75 min)→settling (76-120 min)+sampling
→mixing (121-135 min)→settling (136-180 min)+sampling
→mixing (181-195 min)→settling (196-240 min)+sampling
→treated effluent was decanted The treatment sequence included four 1-hour long cycles, each cycle include 15 min mixing+45 settling/regeneration.

After the first treatment sequence which lasted 4 hour in total, a second run was conducted following the same procedure.

The sequential batch reactor experiment with real FGD wastewater showed that a multiple-regeneration-cycle treatment was needed to decrease selenate-Se from over 2 ppm to below 20 ppb level for real FGD wastewater. Reduction of nitrate, however, was largely suppressed in the sequential batch reactor system. The complexity of real FGD wastewater required multiple cycle and longer treatment time to achieve desirable treatment efficiency. Preferential reduction of selenate over nitrate was still achievable with the super-reactive iron oxide.

Figure 7:
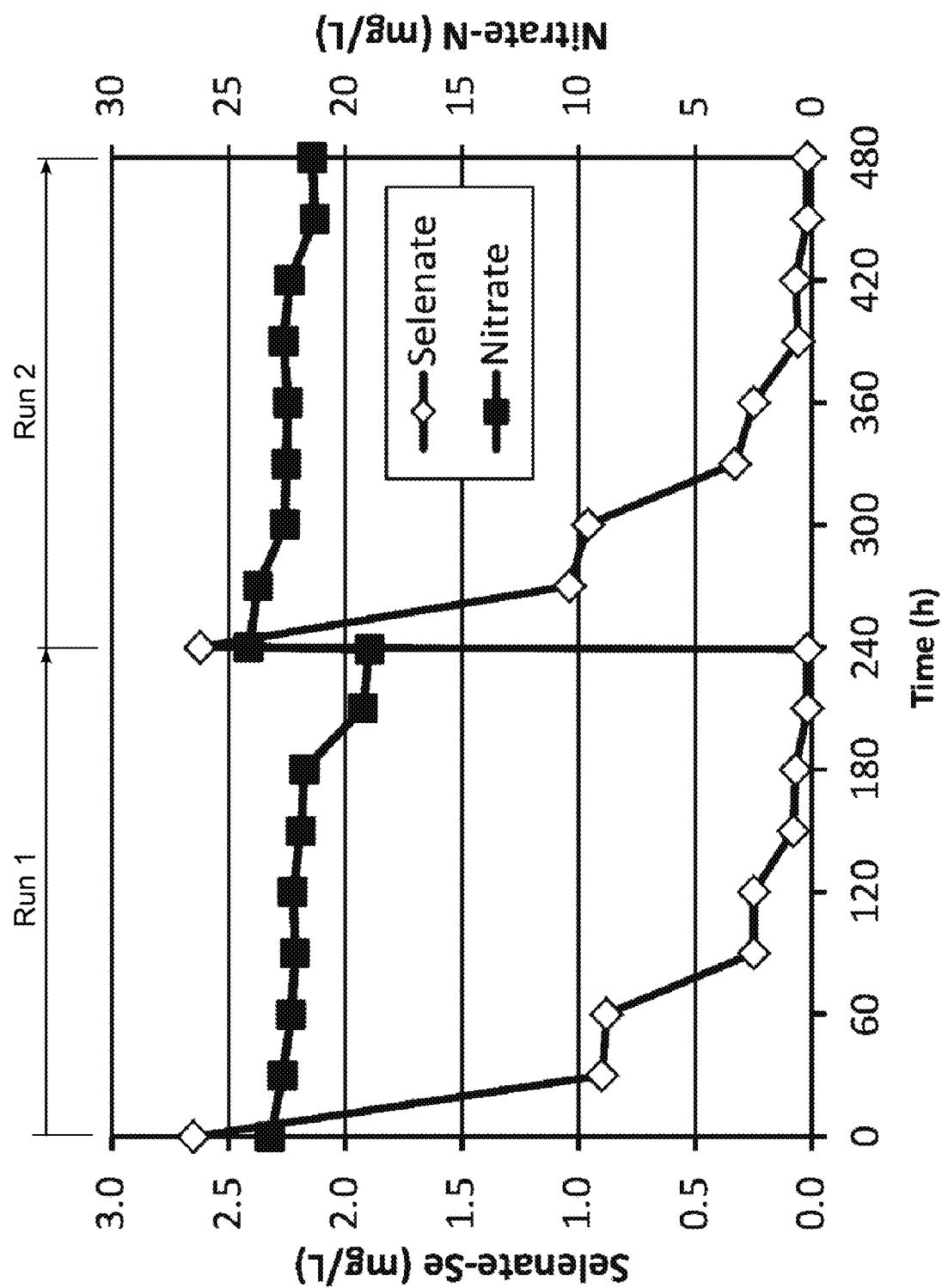
FIG. 7 is a graph showing selenate and nitrate reduction over time by a sequential batch activated iron reactor system for treating real FGD wastewater.

FIG. 7 shows selenate and nitrate reduction over time by a sequential batch activated iron reactor system for treating real FGD wastewater. Two runs were conducted, each lasting 4 hours. Each run consisted of four 1-hour mixing-settling cycles that include 15 min mixing followed by 45 min settling/regeneration phase. Overall, less than 20% of nitrate was removed while selenate reduction was over 99%.

Constant Stirred Tank Reactor

A constant stirred tank reactor having dimensions of 15 cm (L)×15 cm (W)×28 cm (D), with an effective volume of about 6.0 liter was provided. A settling tank having dimensions of 15 cm (L)×15 cm (W)×25 cm (D), with an effective volume of about 3 liter was also provided. A synthetic wastewater was prepared as 10 mg/L nitrate-N+5 mg/L selenate-Se in deionized water. A Fe(II) reagent was provided as a 50 mM $Fe^{2+}$ stock solution (prepared from $FeCl_2$).

The incoming wastewater feeding rate was 200 mL/min, provided by peristaltic pump, corresponding to an HRT=30 min in the continuously stirred tank reactor. The $Fe^{2+}$ feeding rate was 4 mL/min, provided by peristaltic pump, corresponding to a dosage of 1 mM $Fe^{2+}$ with a dilution rate of 50 (reagent/water). The precipitated activated iron sludge recycling flow rate (back to the continuously stirred tank reactor) was 40 mL/min.

The hybrid zero-valent iron composite was prepared by adding 600 g fresh ZVI power (325 mesh) into the continuously stirred tank reactor filled with 6 liter DI water. 17 g of $NaNO_3$ (0.2 mol) and 39.8 g of $FeCl_2*4H_2O$ (0.2 mol) were added to the reactor and mixing was started to allow for complete reduction of nitrate by ZVI that would produce in situ about 70 g of fresh magnetite particles. By the end of this preconditioning process, the reactive solid phase was estimated to include about 70 g discrete magnetite particles+ 550 g magnetite-coated ZVI powder.

The treated effluent was sampled once every hour consecutively for an 8-hour experiment period and analyzed for selenate and nitrate reduction.

After treating the wastewater, selenate in all treated effluent samples was below 10 ppb. Nitrate was in the range of 6.5 to 7.8 mg/L in the treated effluent. The results showed that preferential reduction of selenate over nitrate could be achieved in a CSTR with external sludge settling and return configuration. Selenate reduction from 5 ppm to below 10 ppb could be achieved with a short retention time of 30 min. Under the comparable conditions, a single-stage hybrid zero-valent iron composite reactor system with internal settling tank system would require more than 4 hour reaction time to achieve similar selenate reduction level. Additional experiments showed that mixing the returned sludge with wastewater could instantly decrease selenate to below 100 ppb level. Therefore, results from this experiment demonstrated that external settling basin could be an effective method to generate super-reactive hybrid zero-valent iron composite and also to achieve preferential reduction of selenate over nitrate.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of removing or reducing a concentration of a contaminant in a fluid, the method comprising one or more cycles, each cycle comprising:
    (a) mixing a fluid comprising a contaminant with an aqueous suspension of particles of activated iron media, the activated iron media comprising zero-valent iron, ferrous iron, and magnetite, and wherein the activated iron media has a first activity for reducing the concentration of the contaminant, wherein contacting the fluid comprising the contaminant with the particles reduces the concentration of the contaminant in the fluid and the first activity decreases to a second activity during mixing;
    (b) settling the aqueous suspension to provide a settled solid and a supernatant solution substantially free of the particles, wherein the settled solid provides close contact of the zero-valent iron and magnetite to provide electron-enriched magnetite and an activated iron media having a third activity for reducing the concentration of the contaminant, wherein the third activity is greater than the second activity;
    (c) re-suspending the settled solid in the fluid to provide an aqueous suspension comprising particles of activated iron media, the activated iron media having electron-enriched magnetite; and
    (d) optionally removing the supernatant solution from the settled solid and adding a second fluid comprising a contaminant prior to re-suspending the settled solid in step (c).

2. The method of claim 1 further comprising repeating steps (a) through (d) two or more times.

3. The method of claim 1, comprising performing steps (a)-(d) in a fluidized bed reactor.

4. The method claim 1, wherein the contaminant is selected from the group consisting of an arsenic compound, an aluminum compound, an antimony compound, a beryllium compound, a mercury compound, a selenium compound, a cobalt compound, a lead compound, a cadmium compound, a chromium compound, a silver compound, a zinc compound, a nickel compound, a molybdenum compound, a thallium compound, a vanadium compound, an arsenic ion, an aluminum ion, an antimony ion, a beryllium ion, a mercury ion, a selenium ion, a cobalt ion, a lead ion, a cadmium ion, a chromium ion, a silver ion, a zinc ion, a nickel ion, a molybdenum ion, a thallium ion, a vanadium ion, borates, nitrates, bromates, iodates, periodates, trichloroethylene, dissolved silica, and combinations thereof.

5. The method of claim 1, wherein the fluid is selected from flue gas desulfurization wastewater, industrial waste stream, oil refinery waste, tail water of a mining operation, stripped sour water, surface water, ground water, and an influent stream.

6. The method claim 1, wherein the contaminant is selenate or nitrate.

7. The method claim 6, wherein concentration of selenate is selectively reduced in the presence of nitrate.

* * * * *